(12) United States Patent
Ashbrook et al.

(10) Patent No.: US 8,102,938 B2
(45) Date of Patent: Jan. 24, 2012

(54) TUNING SYSTEM AND METHOD USING A SIMULATED BIT ERROR RATE FOR USE IN AN ELECTRONIC DISPERSION COMPENSATOR

(75) Inventors: Jonathan B. Ashbrook, Homer, IL (US); Andrew C. Singer, Champaign, IL (US); Naresh R. Shanbhag, Champaign, IL (US); Robert J. Drost, Champaign, IL (US)

(73) Assignee: Finisar Corporation, Sunnyvale, CA (US)

( * ) Notice: Subject to any disclaimer, the term of this patent is extended or adjusted under 35 U.S.C. 154(b) by 940 days.

(21) Appl. No.: 12/107,581

(22) Filed: Apr. 22, 2008

(65) Prior Publication Data

US 2009/0262870 A1 Oct. 22, 2009

(51) Int. Cl.
*H04L 27/00* (2006.01)
(52) U.S. Cl. .................................................... 375/295
(58) Field of Classification Search ............... 375/259, 375/262, 316, 324, 338, 340, 341, 346; 704/242; 714/795; 379/387.02; 324/607; 341/126, 341/127, 128, 155, 156, 159
See application file for complete search history.

(56) References Cited

U.S. PATENT DOCUMENTS

| | | | |
|---|---|---|---|
| 6,070,263 A | 5/2000 | Tsui et al. | |
| 6,161,210 A | 12/2000 | Chen et al. | |
| 6,396,878 B1 | 5/2002 | Pitrainen | |
| 7,117,426 B2 | 10/2006 | Wu | |
| 7,127,664 B2 | 10/2006 | Nichol | |
| 7,131,055 B2 | 10/2006 | Mathew | |
| 7,206,363 B2 | 4/2007 | Hegde et al. | |
| 2001/0035994 A1 | 11/2001 | Agazzi et al. | |
| 2001/0035997 A1 | 11/2001 | Agazzi | |
| 2002/0012152 A1 | 1/2002 | Agazzi et al. | |
| 2002/0060827 A1 | 5/2002 | Agazzi | |
| 2002/0080898 A1 | 6/2002 | Agazzi et al. | |
| 2002/0126775 A1 | 9/2002 | Chappaz | |
| 2002/0141347 A1* | 10/2002 | Harp et al. | 370/248 |
| 2005/0157823 A1* | 7/2005 | Sudhakar | 375/341 |
| 2005/0180287 A1* | 8/2005 | Lee et al. | 369/59.15 |
| 2006/0274620 A1* | 12/2006 | Haddad | 369/53.31 |

OTHER PUBLICATIONS

Bahl, L.R., et al. "Optimal Decoding of Linear Codes for Minimizing Symbol Error Rate," IEEE Transactions on Information Theory, Mar. 1974, pp. 284-287.
Black, Peter J., Meng, Teresa H., *A 140-Mb/s, 32-State, Radix-4 Viterbi Decoder*, IEEE Journal of Solid-State Circuits, vol. 27, No. 12, pp. 1877-1885, Dec. 1992.
Black, Peter J., Meng, Teresa H., *A 1-Gb/s, Four-State, Sliding Block Viterbi Decoder*, IEEE Journal of Solid State Circuits, vol. 32, No. 6, pp. 797-805, Jun. 1997.

(Continued)

*Primary Examiner* — Sam K Ahn
(74) *Attorney, Agent, or Firm* — Maschoff Gilmore & Israelsen

(57) ABSTRACT

A system and method is disclosed for controlling signal conditioning parameters and a sampling parameter controlling conversion of a received signal to digital sampled values prior to decoding. The sampled values are decoded according to a comparison with expected values calculated according to a model of a transmission channel. The model is also updated from time to time by comparing the expected values with actual sampled values. Variation of the expected values over time is calculated. One or more of the signal conditioning parameters and the sampling parameter are adjusted according to a numerical minimization method such that the system BER is reduced.

28 Claims, 15 Drawing Sheets

OTHER PUBLICATIONS

Boo, M., et al., *High Speed Viterbi Decoder: An Efficient Scheduling Method to Exploit the Pipelining*, IEEE Int'l, Conference on Application Specific Array Processors, Chicago, IL, Aug. 19-21, 1996.

Boo, Montse, et al. *High-Performance VLSI Architecture for the Viterbi Algorithm*, IEEE Transactions on Communications, vol. 45, No. 2, pp. 168-176, Feb. 1997.

Bulow, Henning, Thielecke, Gunther, *Electronic PMD Mitigation- From Linear Equalization to Maximum-Likelihood Detection*, Optical Fiber Communications Conference and Exhibit, vol. 3, pp. WAA3-1-WAA3-3, 2001.

Chinnery, David, et al. "Achieving 550 MHz in an ASIC Methodology," Proceedings of the $38^{th}$ Design Automation Conference, Las Vegas, NV, pp. 420-425, Jun. 2001.

Chinnery, David, et al., "Achieving 550 MHz in an ASIC Methodology", presentation, Proceedings of the $38^{th}$ Design Automation Conference, Las Vegas, NV, pp. 420-425, Jun. 2001.

Choi, Young-bae, "A VLSI Architecture for High Speed and Variable Code Rate Viterbi Decoder" ISCPAT, Proceedings, pp. 1918-1922, 2000.

Conway, T., *Implementation of High Speed Viterbi Detectors*, Electronics Letters, 35(24):2089-2090, Nov. 25, 1999.

Fettweis, Gerhard, et al. *Reduced-Complexity Viterbi Detector Architectures for Partial Response Signaling*, IEEE Global Telecommunications Conference, Singapore, vol. 1, pp. 559-563, Nov. 1995.

Fettweis, Gerhard, Meyr Heinrich, *High-Speed Parallel Viterbi Decoding: Algorithm and VLSI-Architecture*, IEEE Communications Magazine pp. 46-55, May 1991.

Fettweis, Gerhard, Meyr Heinrich, *Parallel Viterbi Algorithm Implementation: Breaking the ACS-Bottleneck*, IEEE Transactions on Communications, vol. 37, No. 8, pp. 785-790, Aug. 1989.

Fettweis, Gerhard, Meyr. Heinrich, *High-Rate Viterbi Processor: A Systolic Array Solution*, IEEE Journal on Selected Areas in Communications, vol. 8, No. 8, pp. 1520-1534, Oct. 1990.

Forney, G.D., Jr., "The Viterbi Algorithm" Proceedings of the IEEE vol. 61, Issue 3, Mar. 1973 pp. 268-278.

Furuya, Yukitsuna, et al., "A Practical Approach Toward Maximum Likelihood Sequence Estimation for Band-Limited Nonlinear Channels", IEEE Transactions on Communications, vol. Com-31, No. 2, Feb. 1983.

Gross, Warren J., et al., "Difference Metric Soft-Output Detection: Architecture and Implementation," IEEE Transactions on Circuits and Systems II (Analog and Digital Signal Processing), vol. 48, No. 10, pp. 904-911, Oct. 2001.

Haunstein, H.F., Sticht K., *Design of Near Optimum Electrical Equalizers for Optical Transmissions in the Presence of PMD*, Optical Fiber Communications Conference and Exhibit, vol. 3, pp. WAA4-1-WAA-4-3, 2001.

Haykin, Simon S., *Adaptive Filter Theory*, pp. 8-10, 1986, Prentice Hall, Englewood Cliffs, New Jersey.

Hekstra, Andries P., *An Alternative to Metric Rescaling in Viterbi Decoders*, IEEE Transactions on Communications, vol. 37, No. 11, pp. 1220-1222, Nov. 1989.

Kang, Inyup and Willson, Alan N., Jr., "Low-Power Viterbi Decoder for CDMA Mobile Terminals," IEEE Journal of Solid-State Circuits, vol. 33, No. 3 Mar. 1998.

Kim, Kyoung, Powers, Edward J., *A Digital Method of Modeling Quadratically Nonlinear Systems with a General Random Input*, IEEE Transactions on Acoustics, Speech and Signal Processing, vol. 36 No. 11, pp. 1758-1769, Nov. 1988.

Lee, Edward A., Messerschmitt, David G., *Digital Communication— Second Edition*, pp. 406-409, 1994, Kluwer Academic Publishers, Norwell, MA.

Liu, K.J. Ray and Raghupathy, Arun, "Algorithm-Based Low-Power and High-Performance Multimedia Signal Processing," proceedings of the IEEE, vol. 86, No. 6, Jun. 1998.

Ma, Howard H., et al, "On Tail Biting Convolutional Codes," IEEE Transactions of Communications, IEEE Service Center, Piscataway, NJ, US, vol. Com-34, No. 2, Feb. 1986, pp. 104-111.

McGinty, Nigel C., et al. "Equalization of Sparse ISI Channels Using Parallel Trellises," proceedings GLOBECOM'98, Nov. 1998.

Paaske, Erik, et al., "High Speed Viterbi Decoder Architecture," First ESA Workshop on Tracking, Telemetry and Command Systems, ESTEC, Jun. 1998.

Parhi, Keshab K., *Pipelining and Parallel Processing*, VLSI Digital Signal Processing Systems: Design and Implementation, pp. 63-73, 1999.

Ragupathy, Arun and Liu, K.J. Ray, "A Transformation for Computational Latency Reduction in Turbo-MAP Decoding," Proceedings of the 1999 IEEE International Symposium on Circuits and Systems, vol. 4, May 30-Jun. 2, 1999, pp. 402-405.

Ranpara, Samirkumar, "A Low-Power Viterbi Decoder Design for Wireless Communications Applications," Int. ASIC Conference, Washington, D.C., Sep. 1999.

Reeve, J.S., "A Parallel Viterbi Decoding Algorithm," Department of Electronics and Computer Science, University of Southampton, Southampton, UK, Jul. 21, 2000.

Robertson, Patrick, Hoeher, Peter, *Optimal and Sub-Optimal Maximum a Posteriori Algorithms Suitable for Turbo Decoding*, ETT vol. 8, pp. 119-125, Mar.-Apr. 1997.

Shanbhag, Naresh R., *Algorithms Transformation Techniques for Low-Power Wireless VLSI Systems Design*, International Journal of Wireless Information Networks, vol. 5, No. 2, Apr. 1, 1998, pp. 147-171.

Shung, C.B., et al., *VLSI Architectures for Metric Normalization in the Viterbi Algorithm*, IEEE Conf. on Communications, vol. 4, Apr. 1990, pp. 1723-1728.

Sieben, Mike, et al., *Optical Single Sideband Transmission at 10Gb/s Using Only Electrical Dispersion Compensation*, Journal of Lightwave Technology, vol. 17, No. 10 pp. 1742-1749, Oct. 1999.

Summerfield, S. "Analysis of Convolutional Encoders and Synthesis of Rate-2/n Viterbi Decoders," IEEE Transaction on Information Theory, vol. 42, No. 4, p. 1280-1285, Jul. 1996.

Tzou, Kou-Hu, Dunham, James G., *Sliding Block Decoding of Convolutional Codes*, IEEE Transactions on Communications, vol. Com-29, No. 9, pp. 1401-1403, Sep. 1981.

Winters, Jack H., Gitlin, Richard D., "Electrical Signal Processing Techniques in Long-Haul Fiber-Optic Systems," IEEE Transactions of Communication, vol. 38, No. 9 Sep. 1990, pp. 1439-1453, in particular, pp. 1445-1446.

Yeung, A.K. and Rabaey, J.M., *A 210Mb/s Radix-4 Bit-Level Pipelined Viterbi Decoder*, IEEE International Solid-State Circuits Conference, 1995, Digest of Technical Papers, $42^{nd}$ ISSCC, San Francisco, CA.

U.S. Appl. No. 10/603,388, Mar. 13, 2006, Office Action.
U.S. Appl. No. 10/603,388, Sep. 18, 2006, Office Action.
U.S. Appl. No. 10/603,388, Dec. 7, 2006, Notice of Allowance.
U.S. Appl. No. 10/603,388, Nov. 9, 2006, Interview Summary.

* cited by examiner

| | 001 | 010 | 101 | 011 | 110 | 100 | 000 | 001 | 011 | 111 |
|---|---|---|---|---|---|---|---|---|---|---|
| Estimate Vector ($y$) | 001 | 010 | 101 | 011 | 110 | 100 | 000 | 001 | 011 | 111 |
| Estimate Values Over Time | 0<br>1<br>0<br>1<br>1 | 12<br>13<br>13<br>12<br>12 | 2<br>2<br>2<br>3<br>2 | 13<br>14<br>14<br>13<br>14 | 14<br>15<br>14<br>14<br>14 | 1<br>1<br>0<br>1<br>1 | 0<br>0<br>0<br>1<br>0 | 0<br>1<br>1<br>0<br>0 | 14<br>15<br>15<br>14<br>14 | 16<br>16<br>15<br>15<br>16 |
| Noise Vector ($\lambda$) | $V_{001}$ | $V_{010}$ | $V_{101}$ | $V_{011}$ | $V_{110}$ | $V_{100}$ | $V_{000}$ | $V_{001}$ | $V_{011}$ | $V_{111}$ |
| Mean Vector ($\bar{\mu}$) | $\bar{x}_{001}$ | $\bar{x}_{010}$ | $\bar{x}_{101}$ | $\bar{x}_{011}$ | $\bar{x}_{110}$ | $\bar{x}_{100}$ | $\bar{x}_{000}$ | $\bar{x}_{001}$ | $\bar{x}_{011}$ | $\bar{x}_{111}$ |

TUNING SYSTEM AND METHOD USING A SIMULATED BIT ERROR RATE FOR USE IN AN ELECTRONIC DISPERSION COMPENSATOR

BACKGROUND OF THE INVENTION

1. The Field of the Invention

This application relates to optical receivers and, more particularly, for receivers including electronic dispersion compensation.

2. The Relevant Technology

In an electronic dispersion compensating (EDC) system, signals are received over a transmission channel, such as an optical fiber, from a transmitter. Optical signals are converted to electrical signals, such as by means of a photodiode. The electrical signals are supplied to an analog front end (AFE) of the EDC, which typically includes a clock recovery unit (CRU), a variable gain amplifier (VGA), and an analog to digital converter (ADC). The VGA both amplifies and applies a bias to the electrical signal prior to sampling by the ADC. The clock recovery unit detects bit transitions in the electrical signal in order to generate a clock signal in phase with the received signal. The ADC samples the electrical signal at a time offset relative to the recovered clock signal in order to generate a sampled signal. Each sample typically includes a multi-bit value, such as four, eight, or sixteen bits.

The samples are supplied to a maximum likelihood sequence estimator (MLSE) which examines a sequence of samples simultaneously to decode the information encoded in the transmitted signal. Multiple samples are examined simultaneously to enable equalization of intersymbol interference (ISI) caused by pulse spreading during transmission.

In some MLSEs, such as the MLSE disclosed in U.S. patent application Ser. No. 11/736,515, filed Apr. 17, 2007, which is incorporated herein by reference, a channel estimator is used to model the channel over which the signal is transmitted. More specifically, the channel estimator models intersymbol interference experienced by the transmitted signal. Accordingly, the channel estimator will output for a given multi bit sequence, an expected sampled value for a given bit in that sequence. For example, for the bit sequence 010, the model of the transmission channel may predict a sampled value of 14 (b1110), for the second bit of the bit sequence.

The channel estimates for some or all possible combinations of the multi bit sequence, e.g. 000, 001, 010 ..., for a three bit sequence, are compared to the sampled values. The MLSE chooses a series of bit sequences such that a combined error metric of a sequence of sampled values relative to the estimates corresponding to the chosen series of bit sequences is at a minimum relative to other possible series of bit sequences. The series of bit sequences are decoded to yield a data word.

In a typical receiver system, the EDC may not receive information regarding the bit error rate (BER) of the decoded data relative to the originally transmitted data. Transmitted data may include parity bits that are analyzed to determine whether data has been correctly decoded. However, because the EDC does not receive this information it is not able to tune its operation such that the BER is reduced.

In view of the foregoing, it would be an advancement in the art to provide a system and method for reducing the BER of a received signal by tuning an EDC without providing the actual BER to the EDC.

BRIEF SUMMARY OF THE INVENTION

In one aspect of the invention, a data signal is transmitted over a channel to generate a distorted signal. The distorted signal is received and conditioned according to signal conditioning parameters and sampled according to at least one sampling parameter. The samples are then decoded by comparing them to expected values determined according to a model of the channel. The expected values are also compared to the sampled values in order to update the model of the channel. Updating of the model causes the expected values to vary over time. The variation of the expected values over time is calculated. The variation and mean of the expected values are used to calculate a simulated bit error rate (BER). One or both of the signal conditioning parameters and the sampling parameter are adjusted such that the simulated BER is reduced.

In another aspect of the invention, the signal conditioning parameters include a gain and a bias applied to a received signal and the sampling parameter is an offset time relative to a clock signal recovered from the received signal.

In another aspect of the invention, the bias and gain are adjusted until the simulated BER reaches a first end condition. The gain is then adjusted until the mean of the estimates reaches a second end condition corresponding to the length of the transmission channel.

In another aspect of the invention, values for the bias and gain are selected according to a numerical method such as the Nelder-Mead algorithm such that over time the simulated BER is reduced.

In another aspect of the invention, decoding the sampled values includes comparing a sequence of sampled values to the expected value and selecting a sequence of expected values such that a combined error metric of the sequence of sampled values relative to the sequence of expected values satisfies an error threshold.

In another aspect of the invention, the sampled values are decoded according to a version of the Viterbi algorithm. For example, a parallel, time-reversed, sliding window Viterbi decoding algorithm may be used.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 7 is a process flow diagram illustrating data structures for use in calculating a simulated bit error rate (BER) in accordance with an embodiment of the present invention;

DETAILED DESCRIPTION OF THE PREFERRED EMBODIMENTS

Figure 1:
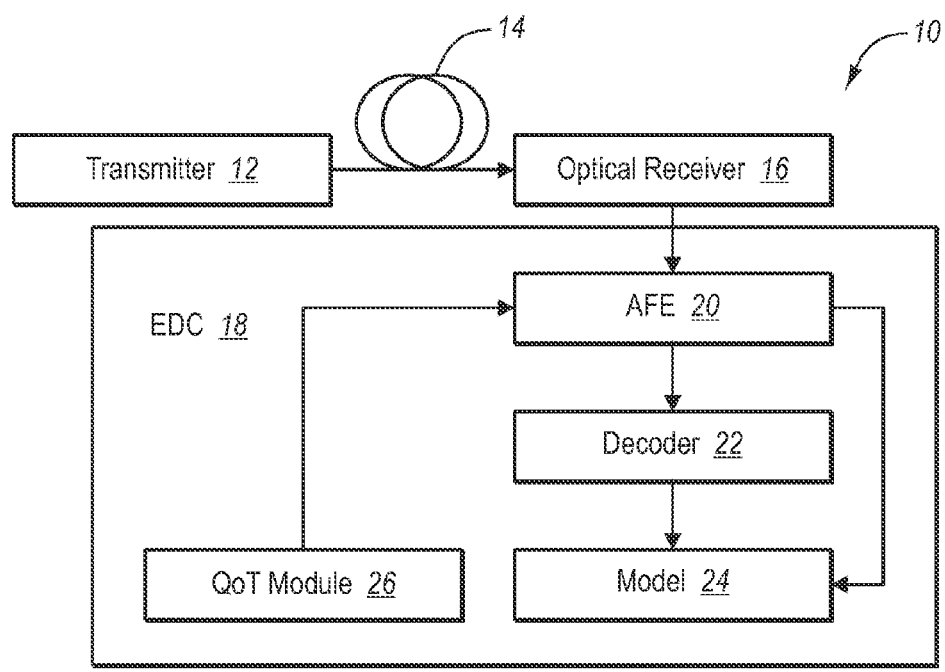
FIG. 1 is a schematic block diagram of an optical transmission system in accordance with an embodiment of the present invention.

Referring to FIG. 1, a system 10 for communicating signals, such as optical signals, may include a transmitter 12, a transmission channel 14, and a receiver 16. The transmitter 12 may include an optical transmitter operable to transmit signals according to various coding schemes such as return to zero (RZ), non-return to zero (NRZ), frequency shift keying (FSK), differential phase shift keying (DPSK), or the like. The receiver 16 is operable to receive signals transmitted over the transmission channel 14 and convert the received optical signal to an amplitude modulated electrical signal having an amplitude corresponding to either a one or zero value.

Most optical transmission channels 14 are somewhat dispersive, which causes data symbols encoded in the transmitted signal to broaden during transmission and interfere with one another, an artifact known as intersymbol interference (ISI). An electronic dispersion compensator (EDC) 18 may be used to reconstruct a transmitted signal from a highly dispersion-distorted received signal according to a model of the transmission channel 14. In some embodiments of the present invention, the EDC 18 is embodied as the system disclosed in U.S. patent application Ser. No. 11/736,515, filed Apr. 17, 2007.

The EDC 18 may include an analog front end (AFE) 20 that conditions an analog output from the receiver 16 and converts that analog output of the receiver 16 to digital signal. For example, the AFE 20 may amplify and/or bias the received signal prior to sampling the received signal.

The AFE 20 produces a digital output that is provided to a decoder 22. The decoder 22 also receives estimates from a model 24 of the transmission channel 14. The model 24 generates estimates of the output of the AFE 20 for a given originally transmitted sequence of bits. The model 24 preferably outputs estimates corresponding to multi-bit sequences such that the estimates reflect an estimate of intersymbol interference that occurs during transmission. The decoder compares the estimates to the actual output of the AFE 10 and selects a series of bit sequences having corresponding estimates that best approximate the actual outputs from the AFE. This selected series of bit sequences is then translated into an output representing an estimate of the originally transmitted data.

The model 24 is updated periodically by comparing the estimates to the actual AFE observations. The BER at the output of the decoder can be strongly affected by the AFE parameters. A quality of transmission (QoT) module 26 measures the estimates over time and calculates a simulated BER based on the mean and variation associated with each estimate. The QoT module 26 adjusts parameters within the AFE 20 such that the simulated BER is reduced. Experiments conducted by the inventor have shown that the simulated BER corresponds closely to the actual BER of the system 10.

Figure 2:
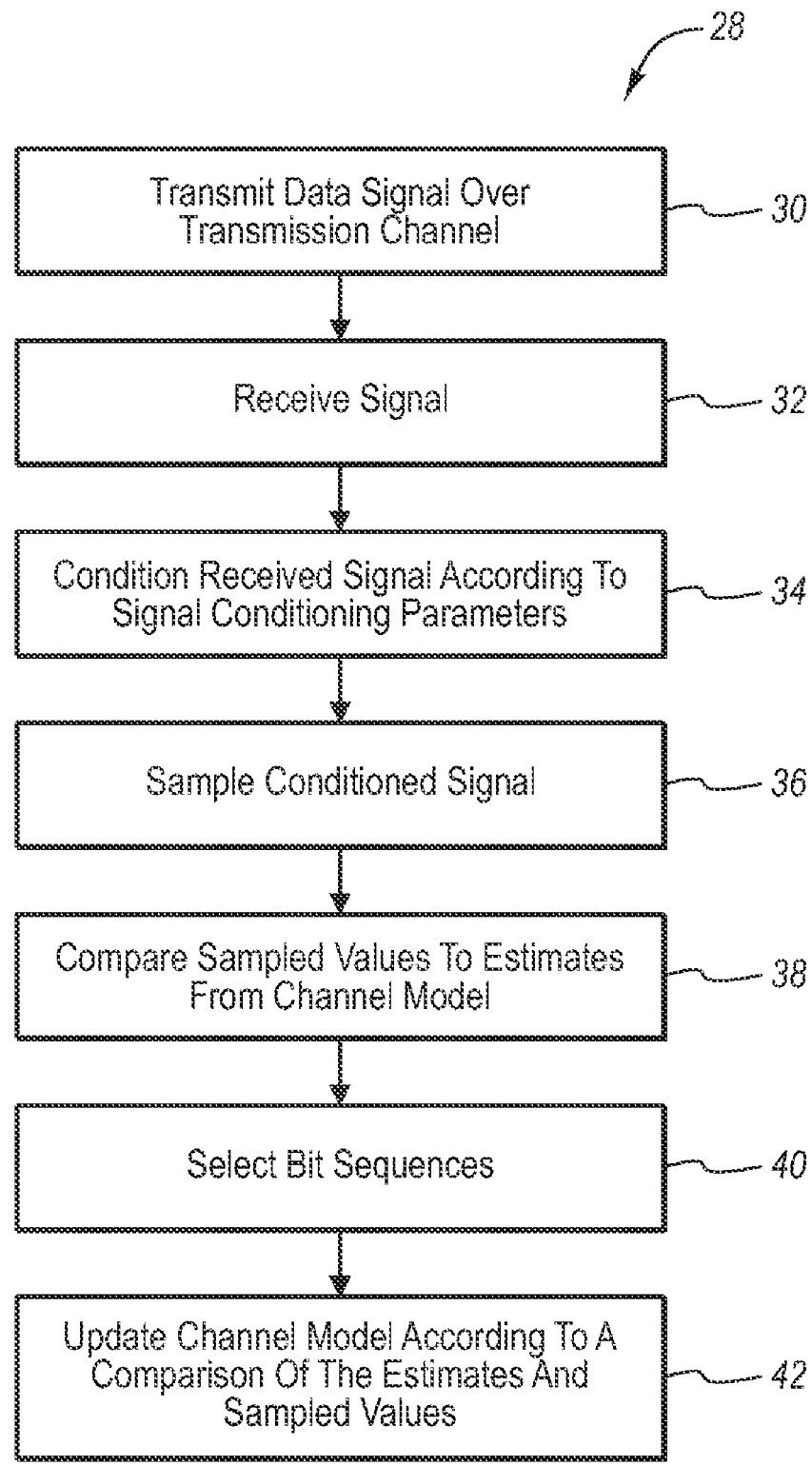
FIG. 2 is a process flow diagram of a method for receiving a signal in accordance with an embodiment of the present invention.

Referring to FIG. 2, a method 28 for transmitting and receiving data may include transmitting a data signal over a transmission channel at step 30. At step 32 the signal is received after travelling through the transmission channel. The signal received at step 32 is typically a distorted version of the originally transmitted signal due, in part, to intersymbol interference caused by dispersion.

At step 34, the received signal is conditioned according to signal conditioning parameters. For example the received signal may be biased and/or amplified. At step 36 the conditioned signal is sampled to generate a series of sampled values. The sampled values are typically multi-bit values such as four, eight, or sixteen bits. The sampling step may include detecting bit transitions in the conditioned signal and sampling the conditioned signal a given offset time after each bit transition.

At step 38, the sampled values are compared to estimated observations calculated according to a model of the transmission channel. Each of the estimates represents an expected sampled value for a specific bit in a specific transmitted bit sequence. For example, one estimate for the middle bit of a transmitted sequence 101 may be 5 whereas the estimate for the middle bit of the sequence 000 may be 2. In some embodiments, a sequence of multiple sampled values is compared to the estimates at step 38. At step 40, a series of bit sequences is selected such that the aggregate error of a series of sampled values relative to the estimates corresponding to the series of bit sequences is below a threshold error or at a minimum relative to other possible series of bit sequences as constrained by a selection algorithm. The selected series of bit sequences represents the reconstructed data signal. Step 40 may include outputting a specific bit from one or more of the selected bit sequences.

At step 42, the channel model is updated according to a comparison of the estimates corresponding to the selected bit sequences and the actual sampled values. In this manner, the channel estimates generated by the channel model may be tuned to correspond to actual operating conditions of the system 10. In some embodiments, step 42 is not performed for every iteration of the method 28, but rather is performed only during certain iterations.

Figure 3:
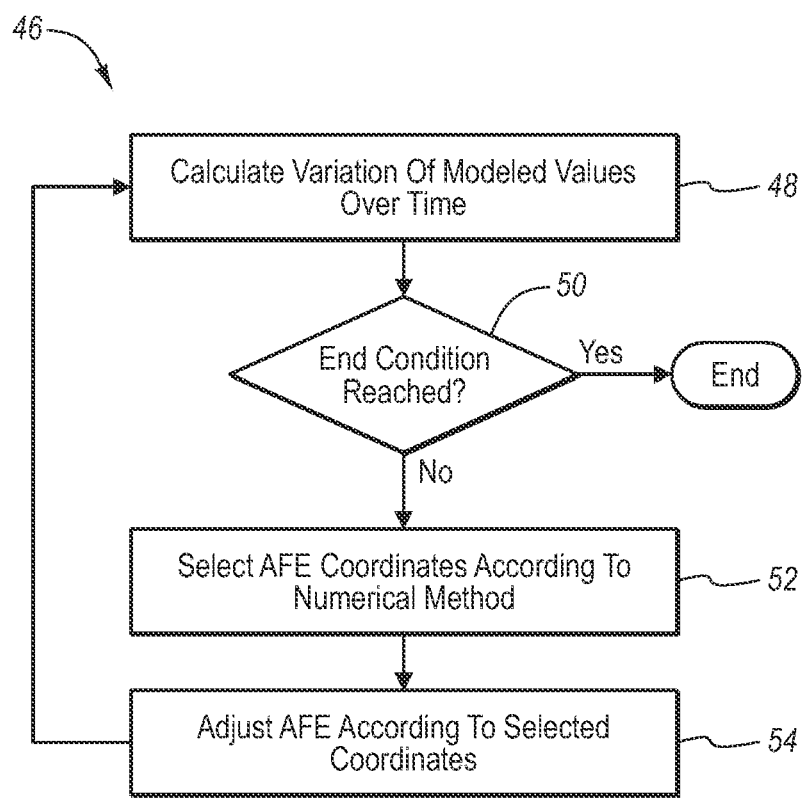
FIG. 3 is a process flow diagram of a method for tuning an analog front and (AFE) in accordance with an embodiment of the present invention.

Referring to FIG. 3, because of noise in the received signal, updating of the model at step 42 will result in variation among the channel estimates over time. The variation may be reduced by properly tuning the signal conditioning parameters used at step 34. A reduction in variation in the channel estimates will result in a reduction of the actual BER of the received data. The variation may also be reduced by adjusting the offset time used for sampling at step 36. Accordingly, a method 46 for reducing the bit error rate of the system 10 may include calculating a variation of the channel estimates at step 48. Step 48 may be performed upon every iteration of the method 28 or only after a certain number of iterations. The variation may be calculated by calculating a variance for each bit sequence using all estimates corresponding to the bit sequence during multiple iterations of the method 28. For example, the estimate corresponding to bit sequence 010 may be equal to 14 for a first iteration, 15 for the second iteration, and 15 for a third iteration. These three estimates would be used to calculate a variance for the bit sequence 010. Variances may be calculated in a like manner for each possible bit sequence. The variances for each bit sequence for which estimates are calculated may be combined to calculate one or more parameters indicative of the quality of transmission (QoT) of the system 10.

At step 50, the variation calculated at step 48 is evaluated relative to an end condition. The end condition may be a threshold value. The end condition may also be a minimum change relative to one or more values calculated at step 48 for previous iterations of the method 46, indicating that the variation is converging on a minimum value. If the end condition is reached the method 46 may end. Alternatively, the method 46 may return to step 48 in order to continuously monitor and reduce the variation.

If the end condition is not reached, step 52 may be performed, wherein AFE settings such as signal conditioning and sampling parameters are chosen in order to reduce the variation. The signal conditioning parameters may include, for example, the gain and/or bias applied to the received signal. A sampling parameter may include an offset time relative to a recovered clock signal at which the received signal is sampled. The values for the signal conditioning parameters and offset time may be chosen according to a numerical method. For example, a plurality of data points may be generated, each including a calculation of variation and the gain, bias, and/or offset time settings that were being used when the estimates on which the variation is based were generated. The data points are processed according to a numerical minimization method, such as the Nelder-Mead algorithm, to select values at step 52 for the next iteration of the method 46 with the objective of minimizing the parameters representing the QoT of the system 10 calculated at step 48. At step 54 the AFE settings are adjusted according to the values selected at step 52.

With respect to the method 46, the parameters adjusted to improve the QoT of the system 10 may include one or more of the bias, gain, and offset time. In some embodiments, all three parameters are adjusted simultaneously. In other embodiments, only one parameter is adjusted until an end condition is reached, followed by the next parameter. In a preferred embodiment, the bias and gain are adjusted simultaneously until an end condition is reached and the offset time is then adjusted singly until another end condition is reached. In another preferred embodiment, the bias and gain are adjusted simultaneously until an end condition is reached, the gain is then adjusted singly until a second end condition is reached. The second end condition may include having the mean of the channel estimates be greater than or equal to a threshold value.

Figure 4:
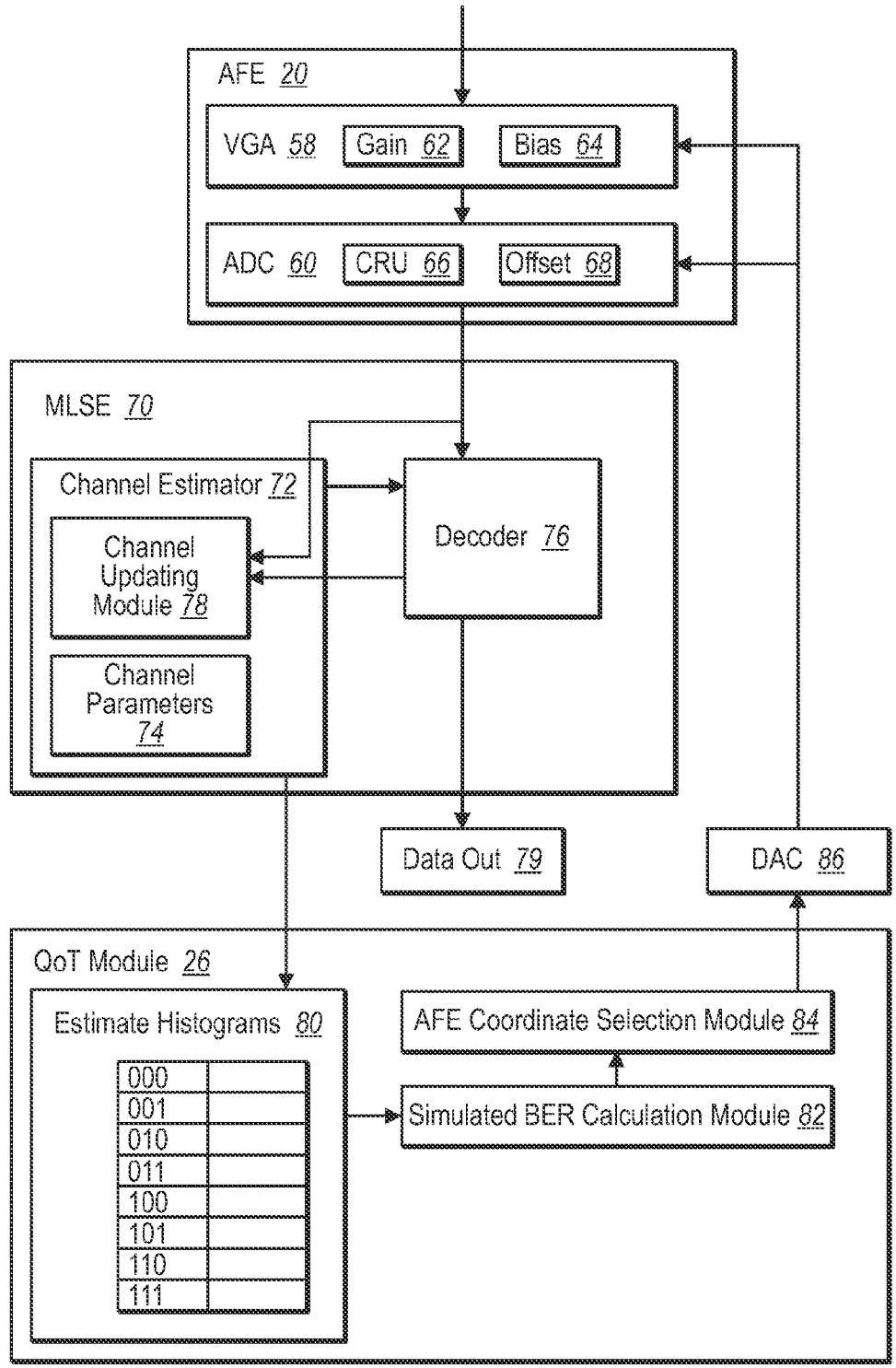
FIG. 4 is a schematic block diagram of an electronic dispersion compensation control system in accordance with an embodiment of the present invention.

Referring to FIG. 4, in some embodiments, the AFE 20 includes a variable gain amplifier (VGA) 58 and an analog to digital converter (ADC) 60. The VGA applies a gain 62 and a bias 64 to a received signal. The gain 62 and bias 64 are adjustable. In some embodiments, the gain 62 and bias 64 are coupled such that an adjustment to one will change the other. In such embodiments, the gain 62 and bias 64 are preferably tuned simultaneously.

The ADC 60 includes a clock recovery unit (CRU) 66 or clock data recovery (CDR) circuit 66. The CRU 66 detects bit transitions in the received signal and outputs a clock signal corresponding to the bit transitions. The ADC 60 samples the received signal in synchronization with the recovered clock signal to generate sampled values. The ADC 60 may include an adjustable offset time 68 that dictates a time following a rising or falling edge of the clock signal at which the ADC 60 will sample the received signal.

In some embodiments, the EDC 18 includes a decoder 22 and model 24 embodied as a maximum likelihood sequence estimator (MLSE) 70. The MLSE 70 may be embodied as the MLSE disclosed in U.S. patent application Ser. No. 11/736, 515, filed Apr. 17, 2007, which discloses an MLSE performing a parallel, time reversed, sliding window Viterbi algorithm to decode a received signal. Other decoding schemes, particularly those using convolution codes, such as other versions of the Viterbi algorithm, may be used.

The MLSE 70 includes a channel estimator 72 that outputs estimates corresponding to the expected outputs of the ADC 60 for a given bit in a given bit sequence. For example, the channel estimator 72 may output an expected value for each possible value of an N-bit sequence. The channel estimator 72 will therefore output $2^N$ estimates or eight estimates for N=3.

The channel estimator may include channel parameters 74 used to model the channel. For example, in one embodiment, the channel parameters are weights $w_0, w_1 \ldots w_k$ multiplied by the bits, or combinations of bits, in the N-bit sequence. The weights may be applied to each possible bit sequence to yield estimates accounting, at least in part, for intersymbol interference. For example, for a three bit sequence $[d_0, d_1, d_2]$, an estimate may be equal to the following: $w_0 \, d_0 + w_1 \, d_1 + w_2 \, d_2 + w_3 \, d_0 \, d_1 + w_4 \, d_0 \, d_2 + w_5 \, d_1 \, d_2 + w_6$.

The channel estimates are input to a decoder 76. The decoder 76 analyzes M sample sequences with respect to the $2^N$ estimates to decode P bits of data. For example, the decoder 76 may have a 12 bit look-ahead such that 12 samples are analyzed for every one or two output bits.

The decoder 76 may decode the sampled values by comparing a sequence of sampled values to the $2^N$ estimates and selecting the a series of N bit sequences for which an aggregate error of the estimates corresponding to the selected series of N-bit sequences with respect to the sampled values is at or near a minimum. The selected series of N bit sequences are then mapped to specific data symbols and the data symbols are output by the decoder 76 to an output port 79. For example, a sample value equal to 14 may be mapped to the estimate for 010 based on a comparison of the sample value and a number of preceding or succeeding samples with the channel estimates. The decoder will therefore output a binary 1 for this sample value in embodiments where the estimates correspond to the expected sampled value for the second bit of a three bit sequence. Various methods known in the art may be used to accomplish the functionality of the decoder 76, including various convolution code decoding schemes such as the Viterbi algorithm and the methods disclosed in U.S. patent application Ser. No. 11/736,515.

The channel estimator 72 includes a channel updating module 78 that receives the selected estimates, or decoded data symbols, and the actual sampled values. The channel updating module 76 compares estimates selected by the decoder 76 to the actual sampled values for which the estimates were selected and updates the channel parameters such that the estimates will adapt to the actual sampled values. For example, if the decoder selects the estimate for bit sequence 101 for the sampled value of 6, then the channel parameters 74 may be updated such that the estimate for 101 will be closer to 6 in following iterations. Updating of the channel parameters may be accomplished by adjusting the weights $w_0, w_1 \ldots w_k$ such that the estimates conform more closely to the actual sampled values.

The channel estimates generated by the channel estimator 72 may be provided to the QoT module 26. The QoT module maintains histograms 80 corresponding to each possible combination of an N-bit sequence. For example, in embodiments where each estimate corresponds to a three bit sequence, eight histograms may be stored, one for each combination of a three bit sequence (000, 001, 010, 011, 100, 101, 110, 111). Inasmuch as the channel parameters are updated during operation of the MLSE 70, the estimates for each state of the N-bit sequence will vary with time. Each histogram will therefore reflect this variation. In some embodiments, the histograms 80 include a number of stored estimates for each state of the N-bit sequence. In other embodiments, the histograms 80 include a mean and a variance stored for each state. In some embodiments, the histograms 80 are stored by the channel estimator 72 itself and accessed by the QoT module 20.

The QoT module includes a simulated bit error rate (BER) module 82. The simulated BER module 82 calculates a simulated BER corresponding to the variation in the channel estimates over time. Large variations indicate the likelihood of a higher bit error rate inasmuch as the histograms for the estimates are more likely to overlap one another, resulting in an increased likelihood of incorrect decoding of sampled values.

The simulated BER is input to an AFE coordinate selection module 84. The AFE coordinate selection module 84 selects values for one or more of the gain 62, bias 64, and offset time 68 such that the simulated BER is reduced. The AFE coordinate selection module selects the coordinates according to a numerical minimization method. For example, a plurality of data points may be generated, each including a simulated BER and the gain, bias, and/or offset time settings that were being used when the estimates on which the simulated BER is based were generated. The data points are processed according to a numerical minimization method by the AFE coordinate selection module, such as the Nelder-Mead algorithm, to select future values for one or more of the gain 62, bias 64, and offset time 68 such that the simulated BER is reduced.

The selected coordinates are then input to the AFE 20 to change the values of one or more of the gain 62, bias 64, and offset time 68. In some embodiments, the AFE 20 permits only analog adjustment of the gain 62, bias 64, or offset time 68. In such embodiments, these parameters are input to the AFE 20 by means of a digital to analog converter (DAC) 86.

Figure 5:
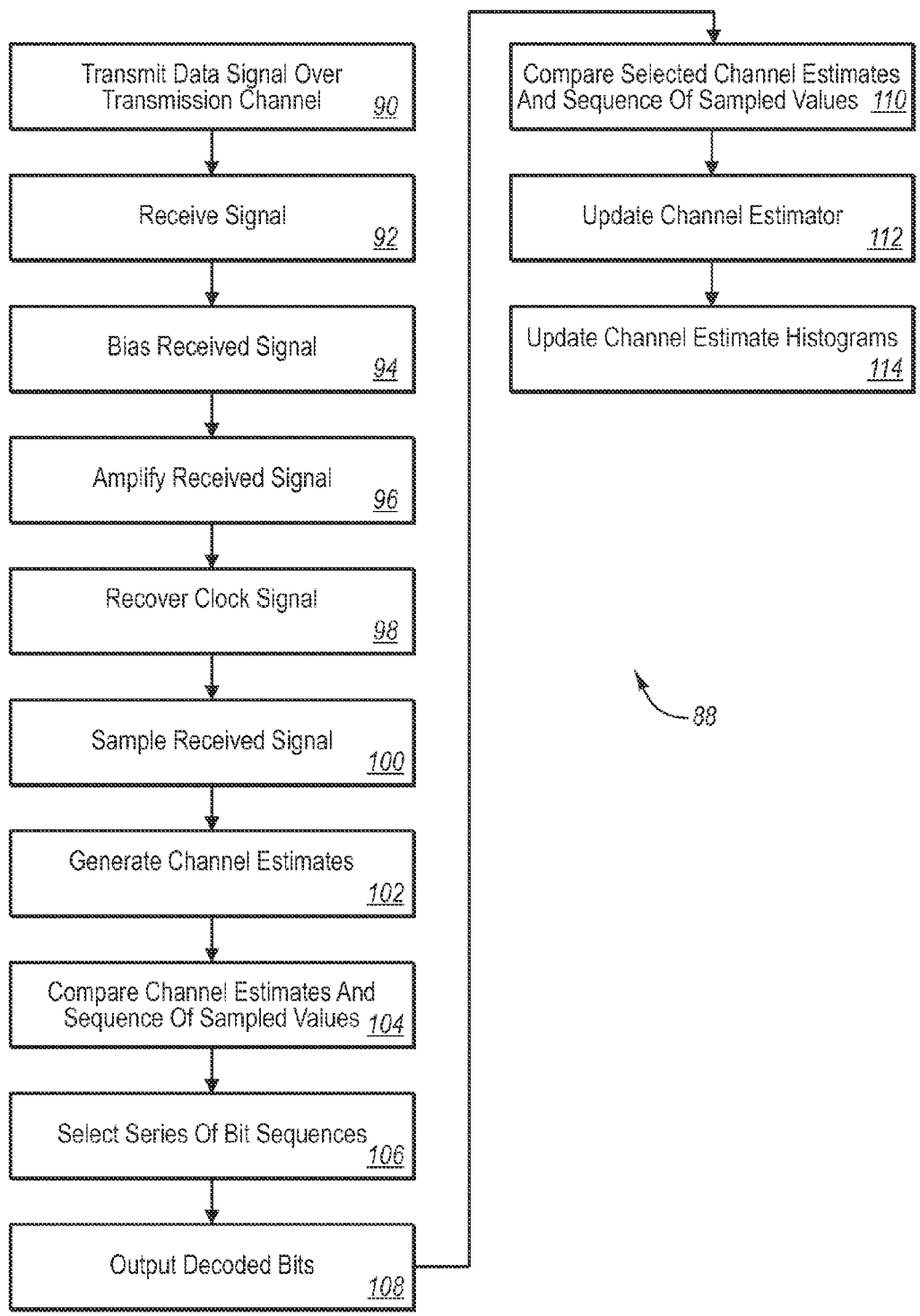
FIG. 5 is a process flow diagram of a method for decoding a received signal in accordance with an embodiment of the present invention.

Referring to FIG. 5, an EDC 18, such as the EDC of FIG. 4 may perform the illustrated method 88. At step 90 of the method 88, a data signal including data symbols $d_n$ is transmitted over a transmission channel, such as a dispersive optical fiber. The transmitted signal is distorted by the transmission channel, in part due to dispersion. The distorted signal is received at step 92. The received signal is biased at step 94 and amplified at step 96. At step 98 a clock signal is recovered by detecting rising and/or falling edges in the received signal. At step 100 the received signal is sampled using the clock signal recovered at step 98. The received signal is sampled according to an offset time after each rising or falling edge of the recovered clock signal to generate samples $r_n$ corresponding the data symbols $d_n$.

At step 102, $2^N$ channel estimates $\hat{r}_0 \ldots \hat{r}_k \ldots \hat{r}_{2^N-1}$ are generated, wherein each estimate $\hat{r}_k$ is equal to an expected sampled value for the i-th bit of an N-bit sequence of value k according to a model of the transmission channel. In the illustrated embodiments, N is equal to three. Thus, estimate $\hat{r}_4$ may be equal to the expected value for the middle 0 in the three bit sequence 100. N may also be equal to four, eight, twelve, or some other value.

At step 104, each sample in a sequence of M samples $r_0 \ldots r_j \ldots r_{M-1}$ is compared to all of the channel estimates $\hat{r}_0 \ldots \hat{r}_k \ldots \hat{r}_{2^N-1}$. In some embodiments, the first two samples of the M-bit sequence for each iteration of the method 88 include two samples from the previous iteration of the method 88. For example, $r_0$ and $r_1$ may be equal to samples $r_{M-2}$ and $r_{M-1}$ from the previous iteration.

At step 106, a series of M N-bit sequences $b_0 \ldots b_j \ldots b_{M-1}$ is selected for the samples $r_0 \ldots r_j \ldots r_{M-1}$ such that an aggregation of the errors of the samples $r_0 \ldots r_j \ldots r_{M-1}$ relative to estimates $\hat{r}_0 \ldots \hat{r}_k \ldots \hat{r}_{2^N-1}$ corresponding to the selected series of M N-bit sequences is at a minimum relative to other possible series of M N-bit sequences. In some embodiments, an aggregate error value equal to $$\sum_{j=0}^{M-1} (r_j - \hat{r}_{k,j})^2$$

is used to determine which series of M N-bit sequence provides an aggregate error that is at a minimum or below a predetermined threshold. In some embodiments, the N-bit sequences $b_0$ and $b_1$, which are preferably the N-bit sequences corresponding to the least recently sampled samples, are constrained to be the N-bit sequences $b_{M-2}$ and $b_{M-1}$, which preferably correspond to the most recent samples, selected in step 106 during the previous iteration of the method 88 for the samples $r_{M-2}$ and $r_{M-1}$. Step 106 in such embodiments therefore includes selecting a series of N-bit sequences of length M−2 for the remaining samples $r_2 \ldots r_j \ldots r_{M-1}$ according to a time-reversed recursion method, such as is disclosed in U.S. patent application Ser. No. 11/736,515, such that the aggregate error with respect to the estimates corresponding to the series of N-bit sequences is at a minimum for all M samples and M selected estimates relative to other series of N-bit sequences that could possibly be selected using the same time-reversed recursion method.

At step 108, an M-bit decoded word $\hat{d}_0 \ldots \hat{d}_j \ldots \hat{d}_{M-1}$ is output based on the M N-bit sequences selected at step 106. For example, each bit $\hat{d}_j$ of the output word may be chosen to be the i-th bit of the selected N-bit sequence $b_j$.

At step 110, some or all of the estimates $\hat{r}_{k,j}$ corresponding to the selected N-bit sequences are compared to the corresponding sample $r_j$ of the M sample sequence for which the series of M N-bit sequences were selected at step 106.

At step 112, the channel parameters are updated according to the comparison at step 110 such that the channel estimator 72 will subsequently output estimates $\hat{r}_{k,j}$ closer to the value $r_j$, for example. At step 114, the histogram for each estimate index k is updated to include the observed sample $r_j$ for the current iteration of the method 106.

Figure 6:
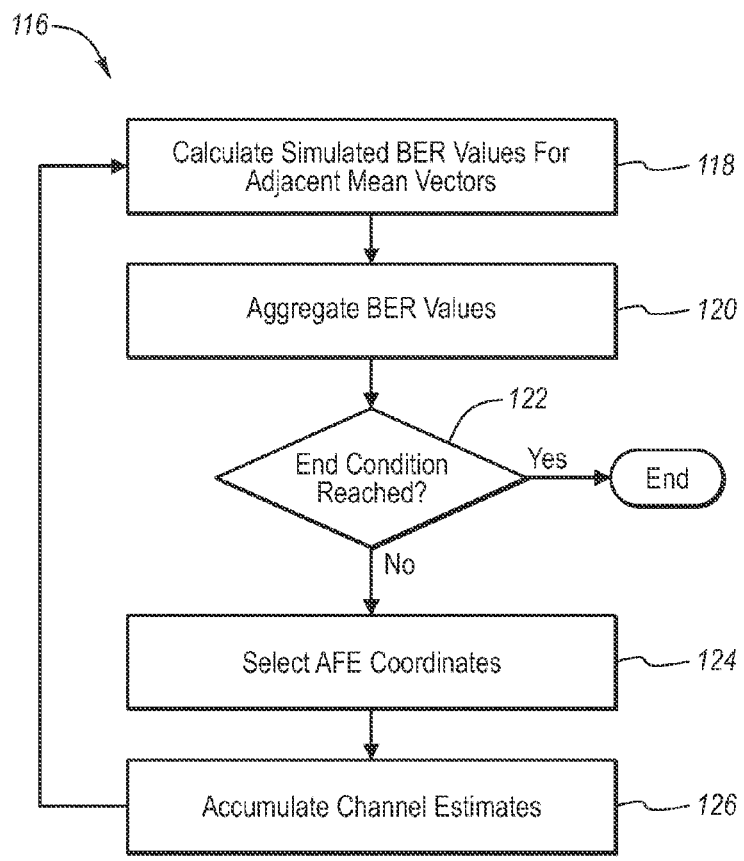
FIG. 6 is a process flow diagram of another method for tuning an AFE in accordance with an embodiment of the present invention.

Referring to FIG. 6, a method 116 may be used to reduce the bit error rate of a receiver system using the estimates $\hat{r}_0 \ldots \hat{r}_k \ldots \hat{r}_{2^N-1}$ generated for each iteration of the method 88. At step 118 of the method 116 a simulated BER is calculated using the estimates $\hat{r}_0 \ldots \hat{r}_k \ldots \hat{r}_{2^N-1}$.

In some embodiments, the simulated BER accounts for the look-ahead of the MLSE 70. For example, where the MLSE has a look-ahead of M samples, the simulated BER may be based on the likelihood of overlap between sequences of M-N+1 estimates, where N is the length of the N-bit sequences for which the estimates are calculated.

Referring to FIG. 7, in such embodiments, a simulated BER may be calculated for M-bit vectors $\vec{w}$ equal to some or all of the $2^M$ possible values for an M-bit data word. Each vector $\vec{w}$ may be decomposed into overlapping N-bit sequences each equal to an index k of an estimate. For example, as shown in FIG. 7, the vector $\vec{w}=[0, 0, 1, 0, 1, 1, 0, 0, 0, 1, 1, 1]$ is decomposed into estimate index vector $\vec{y}=[001, 010, 101, 011, 110, 100, 000, 001, 011, 111]$ of length M−N+1, wherein $y_i = w_i \ldots w_{i+N-1}$.

For each estimate index vector $\vec{y}$ an estimate mean vector $\vec{h} = \bar{x}_0 \ldots \bar{x}_s \ldots \bar{x}_{M-N}$ is calculated wherein $\bar{x}_s$ is equal to a mean of a number of estimates $\hat{r}_k$ over time having the same index $k=y_s$. A noise vector $\vec{\lambda} = v_0 \ldots v_s \ldots v_{M-N}$ may also be calculated for each estimate index vector $\vec{y}$ wherein $v_s$ is equal to a variance of estimate $\hat{r}_k$ over time, where k is equal to $y_s$.

The noise vectors $\vec{\lambda}$ and mean vector $\vec{h}$ for each M-bit vector $\vec{w}$ may be used to determine a simulated BER with respect to one or more M-bit vectors $\vec{w}$ having adjacent mean vectors $\vec{h}$ in Euclidean space. In a preferred embodiment, a simulated BER is only calculated for the closest of one to four mean vectors $\vec{h}$. In a preferred embodiment, only the two closest mean vectors are used.

The simulated BER of an M-bit vector $\vec{w}_a$ with respect to another M-bit vector $\vec{w}_b$ may be calculated by first calculating a unit vector $$\vec{u}_{a \to b} = \frac{\vec{h}_b - \vec{h}_a}{\|\vec{h}_b - \vec{h}_a\|}$$

and a Euclidean distance between the mean vectors $\vec{h}_a$ and $\vec{h}_b$ according to the equation $$d_{a \to b} = \sqrt{\sum_{i=0}^{M-N} (h_{b,i} - h_{a,i})^2}.$$

A noise standard deviation $\sigma_{a \to b}$ from $\vec{w}_a$ to $\vec{w}_b$ may then be calculated according to the equation $$\sigma_{a \to b} = \sqrt{\vec{u}_{a \to b}^T \vec{\lambda}_a \vec{u}_{a \to b}},$$

where $\vec{\lambda}_a$ is the noise vector for M-bit vector $\vec{w}_a$. The simulated BER may be calculated according to the equation $$Q\!\left(\frac{d_{a \to b}}{2\sigma_{a \to b}}\right), \text{ where } Q(x) = 0.5\,\mathrm{erfc}\!\left(\frac{x}{\sqrt{2}}\right).$$

In some embodiments, $\sigma_{a \to b}$ may be normalized according to the equation $$\sigma_{a \to b}^2 = \left(\frac{\sqrt{\sigma_{a \to b}^2}}{\hat{r}_{max}}\right)^2,$$

where $\vec{r}_{max}$ is the largest of the estimates. In other embodiments, the estimates $\hat{r}_0 \ldots \hat{r}_k \ldots \hat{r}_{2^N-1}$ are normalized with respect to $\vec{r}_{max}$ prior to calculation of $\sigma_{a>b}$ such that normalization of $\sigma_{a>b}$ is unnecessary. The values of the variances $v_0 \ldots v_s \ldots v_{M-N}$ may also be normalized prior to calculation of $\sigma_{a \to b}$.

In some embodiments, the simulated BER for an M-bit vector $\vec{w}_a$ with respect to another M-bit vector $\vec{w}_b$ may be calculated in a way that takes into account unequal noise distributions for the vectors $\vec{w}_a$ and $\vec{w}_b$ in order to more accurately measure overlap between the noise distributions. In such embodiments, the simulated BER may be calculated to be equal to $$Q\!\left(\frac{x}{\sigma_{a \to b}}\right),$$

where x is a point of intersection calculated according to the equation:

$$x = \frac{\sigma_{a \to b} \pm \sqrt{\sigma_{a \to b}^2 \sigma_{b \to a}^2 d_{a \to b}^2 + 4\sigma_{a \to b}^2 \sigma_{b \to a}^4 \ln\!\left(\frac{\sigma_{b \to a}}{\sigma_{a \to b}}\right) - 4\sigma_{b \to a}^2 \sigma_{a \to b}^4 \ln\!\left(\frac{\sigma_{b \to a}}{\sigma_{a \to b}}\right)}}{(\sigma_{a \to b}^2 \sigma_{b \to a}^2)^2}$$

As noted above, in some embodiments, the MLSE 70 is constrained such that the first two bits $\vec{d}_0$ and $\vec{d}_1$ in each series are equal to the most recently decoded bits $\vec{d}_{M-2}$ and $\vec{d}_{M-1}$ selected in a previous iteration of the estimate selection step 106 of the method 88 shown in FIG. 5. Accordingly, a simulated BER may be calculated for each M-bit vector $\vec{w}_a$ only with respect to other M-bit vectors $\vec{w}_b$ having the same first two bits, i.e., $w_{a,0} = w_{b,0}$ and $w_{a,1} = w_{b,1}$.

In some embodiments, a simulated BER is only calculated for each M-bit vector $\vec{w}_a$ with respect to two M-bit vectors $\vec{w}_b$ and $\vec{w}_c$, wherein $\vec{w}_b$ has the closest mean vector $\vec{h}_b$ of all M-bit vectors satisfying the relation $w_{a,0} = w_{b,0}$, $w_{a,1} = w_{b,1}$, and $w_{a,2} \neq w_{b,2}$, and wherein $\vec{w}_c$ has the closest mean vector $\vec{h}_c$ of all M-bit vectors satisfying the relation $w_{a,0} = w_{c,0}$, $w_{a,1} = w_{c,1}$, and $w_{a,3} \neq w_{c,3}$. In such embodiments, the simulated BER for each M-bit vector $\vec{w}_a$ may be set equal to $$Q\!\left(\frac{d_{a \to b}}{2\sigma_{a \to b}}\right) + Q\!\left(\frac{d_{a \to c}}{2\sigma_{a \to c}}\right).$$

In still other embodiments, an aggregate BER is calculated with reference to the histograms alone, without reference to particular M-bit vectors $\vec{w}_a$ and $\vec{w}_b$. For example, a histogram divergence may be calculated for some or all of the histograms corresponding to the estimates $\hat{r}_0 \ldots \hat{r}_k \ldots \hat{r}_{2^N-1}$. In such embodiments, step 120 (see below) may be omitted. The histogram divergence D(P,Q) may be calculated for two histograms at two different points in time. For example, the histograms 80 may be stored at a time $t_0$ as a histogram P and an updated histogram stored at time $t_1$ as histogram Q. Stated differently, histogram P may include channel estimates from time $t_0$ to time $t_1$ whereas histogram Q includes channel estimates from time $t_2$ to time $t_3$, with time $t_2$ either equal to or different from time $t_1$ and time $t_3$ not equal to time $t_2$. The histogram divergence may be calculated according to the equation:

$$D(P, Q) = \sum_{k=o}^{2^N-1} \sum_{x=0}^{B-1} P_k(x) \log\left(\frac{P_k(x)}{Q_k(x)}\right),$$

where B is the number of possible ADC values, e.g. 0 to 15 for a four bit ADC, and $P_k(x)$ and $Q_k(x)$ represent the frequency of ADC value x in a histogram of estimates $\hat{r}_k$ for index k.

Referring again to FIG. 6, after a number of simulated bit error rates are calculated at step 118, the simulated bit error rates for some or all of the M-bit vector $\vec{w}$ may be aggregated, such as by averaging or some other means, to generate an aggregate BER at step 120. At step 122, the aggregate simulated BER is evaluated to determine if an end condition has been reached. The end condition may include an aggregate simulated BER less than or equal to a predetermined threshold. Alternatively, the end condition may be when some or all of the AFE coordinate values are less than a particular value (e.g. 0.1) from the AFE coordinate chosen in the previous iteration of the method 116. In other embodiments, the end condition is when some or all of the AFE coordinate values are within a certain tolerance from each other, e.g. 10 mV.

If not, then AFE coordinates are selected at step 124. As noted above, the AFE coordinates include one or more of the bias 64, gain 62, and offset time 68 of the AFE 20 and are selected according to a numerical method such that over multiple iterations the aggregate simulated BER will converge on a minimum value. In some embodiments, the AFE coordinates are first selected in order to sweep the entire coordinate space. For example, both the gain 62 and the bias 64 may be adjusted by a step size for each iteration in order to obtain an aggregate simulated BER for a grid of bias and gain values. Following sweeping the coordinate space, the AFE coordinates at which the aggregate simulated BER was at a minimum may be used as a first seed point for performing the Nelder-Mead algorithm. The Nelder-Mead algorithm requires N+1 seed points when adjusting N variables. The second seed point may be obtained by adding the step size to the gain and the third seed point may be obtained by adding the step size to the bias. Subsequent AFE coordinates may then be selected according to the Nelder-Mead algorithm as known in the art. In some embodiments, the value for the offset time 68 is adjusted separately following selection of values for the gain 62 and bias 64.

At step 126, channel estimates are accumulated. Step 126 may include waiting for a specific period time, for a specific number of sampled values to be received, or for some other event to occur. If the end condition is reached at step 122, the method 116 may end. In other embodiments, the method 116 goes to step 126 to accumulate more channel estimates without adjusting the AFE coordinates when the end condition is reached.

Figure 8:
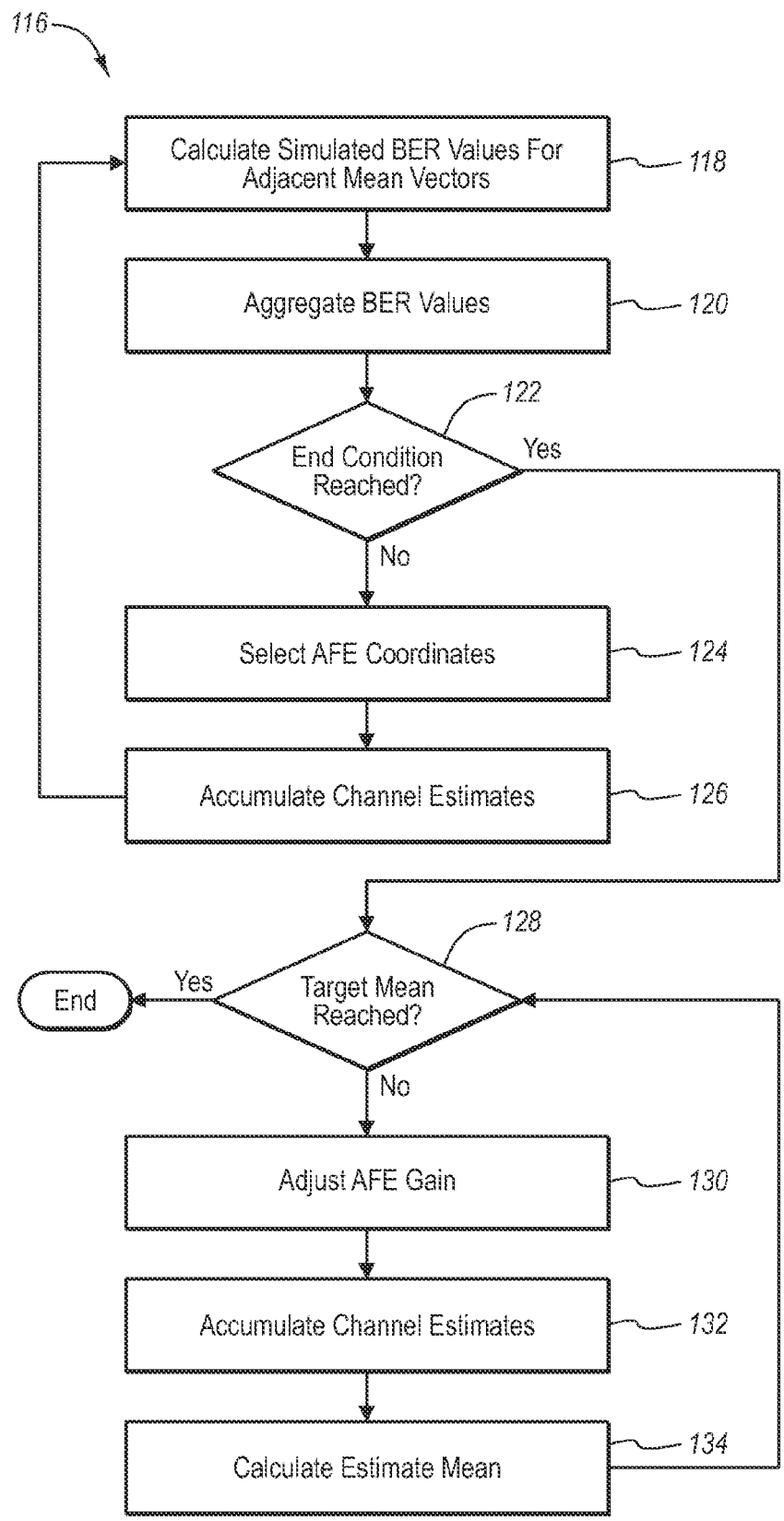
FIG. 8 is a process flow diagram of another method for tuning an AFE in accordance with an embodiment of the present invention.

Referring to FIG. 8, Experiments conducted by the inventor have shown that the AFE setting at which the aggregate simulated BER is at a minimum differs somewhat from the settings at which the actual BER is at a minimum. However, the difference can be reduced by adjusting the gain 62 of the VGA 58 such that the mean of the estimates is equal to a target value chosen according to characteristics of the transmission channel, such as the length of optical fiber through which the signal has passed. For example, for an ADC 60 that outputs four bit values, the target mean may be 7.7 for a 100 km path and 9.0 for a 50 km path.

Accordingly, in the method of FIG. 8, a first end condition is reached according to the steps 118-126 of FIG. 6. After the first end condition is reached at step 122, the mean of the estimates is evaluated with respect to a second end condition, such as a target mean, at step 128. If the target mean has been achieved, then the method may either end, or return to step 120. If the target mean has not been achieved, then the gain 62 is adjusted at step 130. In typical use, the mean will be lower than the target mean after reaching the first end condition. Accordingly, adjusting the gain 62 at step 130 may include raising the gain 62 by an incremental amount. The incremental amount may be fixed or decrease in size with proximity of the actual mean to the target mean. At channel estimates are accumulated using the gain setting of step 130. The mean of the estimates is then calculated at step 134 and compared again to the second end condition or target mean at step 128.

Figure 9:
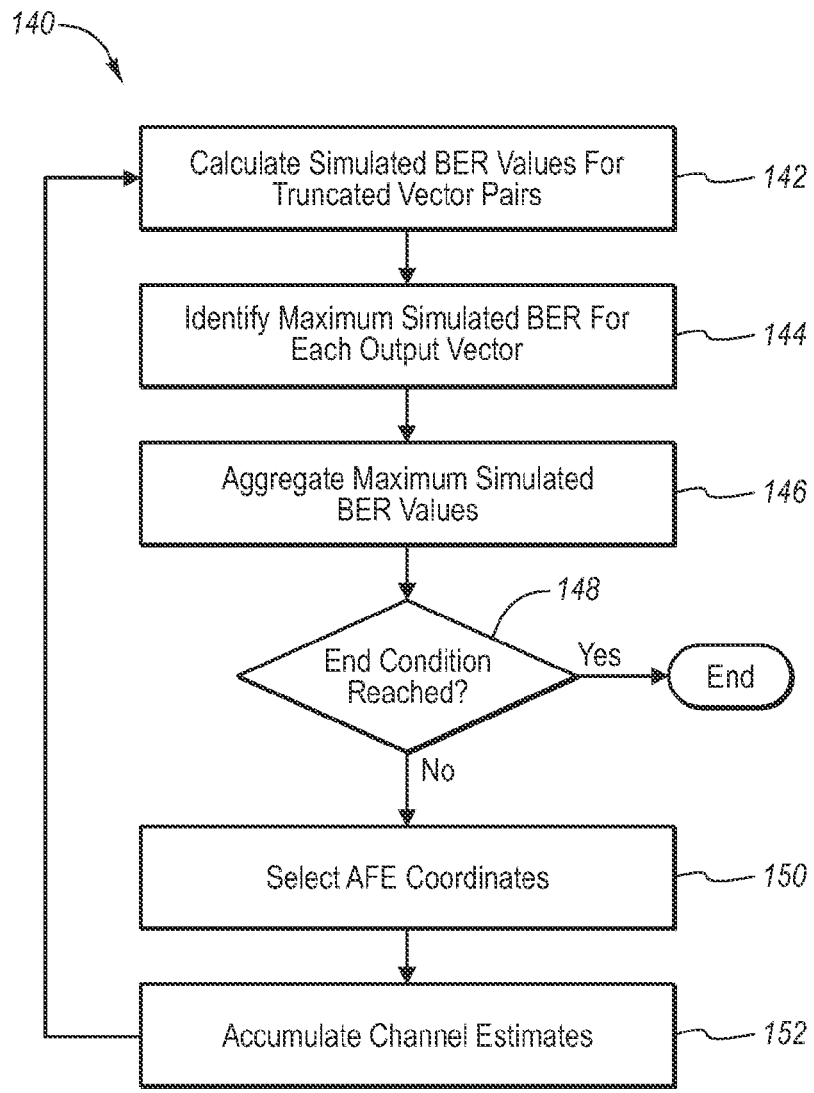
FIG. 9 is a process flow diagram of another method for tuning an AFE in accordance with an embodiment of the present invention.

Referring to FIG. 9, in the above described embodiments, bit sequences of length L−N+1 are examined to determine a simulated BER, where L is the look-ahead and N is the number of bits in the bit sequences corresponding to each estimate. Experiments conducted by the inventors have shown that for a communication channel having typical chromatic dispersion, the closest sequence $\vec{w}_b$ to a given vector $\vec{w}_a$ is one in which only a single error was made. Experiments have shown that only under extreme (non-operating) conditions, such as when the gain of the chip is set so low as to result in BERs too high to be computed by a bit error rate tester (BERT), were sequences $\vec{w}_a$ found for which the closest sequence $\vec{w}_b$ contained more than one bit error. Although this observation is based on empirical observations rather than theory, it may be used to simplify calculation of a simulated BER that is effective for tuning the AFE settings in order to reduce the actual BER.

Figure 10:
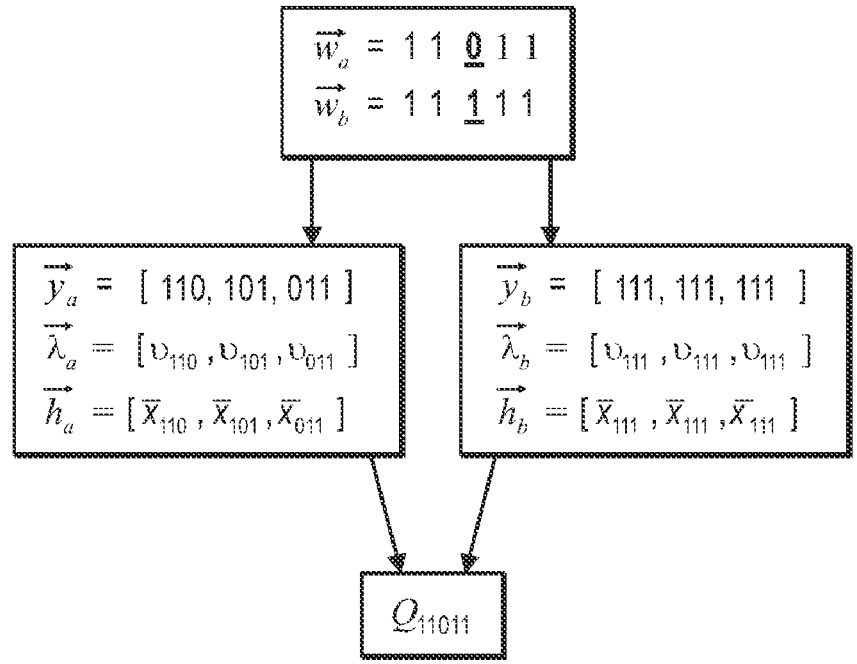
FIG. 10 is a process flow diagram illustrating data structures for use in calculating a simulated BER for truncated vector pairs in accordance with the method of FIG. 9.

In accordance with the foregoing, the method 140 of FIG. 9 may be used to reduce the bit error rate of a receiver system using the estimates $\hat{r}_0 \ldots \hat{r}_k \ldots \hat{r}_{2^N-1}$ generated for each iteration of the method 88. The method 140 includes calculating a simulated BER value for truncated vector pairs at step 142. Referring to FIG. 10, while still referring to FIG. 9, the truncated vector pairs each include first and second vectors $\vec{w}_a$, $\vec{w}_b$, wherein $\vec{w}_a$ of each truncated vector pair is equal to a binary word of length 2N−1 equal to one possible binary value between 0 and $2^{2N-1}-1$. The vector $\vec{w}_b$ of each vector pair is identical to the vector $\vec{w}_a$ except one bit is flipped, i.e. from a one to a zero or from a zero to a one. The bit that is flipped is preferably the bit at the center of the vector, however, other bit positions may also be chosen. In the illustrated embodiment in which N is equal to three, the third bit of the vector $\vec{w}_a$ is flipped to generate the vector $\vec{w}_b$. Thus as shown in FIG. 10, for the vector $\vec{w}_a$=11011 the corresponding vector $\vec{w}_b$ for the truncated vector pair is 11111.

The simulated BER for a truncated pair may be calculated as in the above described embodiments. For example, the vectors $\vec{w}_a$ and $\vec{w}_b$ of each pair may be decomposed into estimate index vectors $\vec{y}_a$ and $\vec{y}_b$, respectively, wherein each element $y_i$ of each index vector is equal to $w_i \ldots w_{i+N-1}$ of its corresponding truncated vector $\vec{w}_a$, $\vec{w}_b$. For the estimate index vectors $\vec{y}_a$ and $\vec{y}_b$ estimate mean vectors $\vec{h}_a$ and $\vec{h}_b$ are calculated where $\vec{b} = \bar{x}_0 \ldots \bar{x}_s \ldots \bar{x}_{N-1}$ and $\bar{x}_s$ is equal to a mean of a number of estimates $\vec{r}_k$ over time having the same index $k = y_s$. A noise vector $\vec{\lambda}_a$ and $\vec{\lambda}_b$ may also be calculated for each index vector $\vec{y}_a$ and $\vec{y}_b$, where $\vec{\lambda} = v_0 \ldots v_j \ldots v_{N-1}$ and $v_s$ is equal to a variance of estimate $\hat{r}_k$ over time, where k is equal to $y_s$. In some embodiments, one or both of the estimates $\hat{r}_0 \ldots \hat{r}_k \ldots \hat{r}_{2^N-1}$ and variances $v_0 \ldots v_s \ldots v_{N-1}$ are also normalized. The estimates $\hat{r}_0 \ldots \hat{r}_k \ldots \hat{r}_{2^N-1}$ may be normalized before calculation of the mean vectors $\vec{h}_a$ and $\vec{h}_b$ and/or variances for each iteration of the method 140.

The simulated BER of truncated vector pair $\vec{w}_a$, $\vec{w}_b$ may be set equal to $$Q\left(\frac{d_{a \to b}}{2\sigma_{a \to b}}\right), \text{ where}$$

$$Q(x) = 0.5 \text{erfc}\left(\frac{x}{\sqrt{2}}\right),$$

$$d_{a \to b} = \sqrt{\sum_{i=0}^{N-1} (h_{b,i} - h_{a,i})^2},$$

$$\sigma_{a \to b} = \sqrt{\vec{u}_{a \to b}^T \vec{\lambda}_a \vec{u}_{a \to b}},$$

$$\vec{u}_{a \to b} = \frac{\vec{h}_b - \vec{h}_a}{\|\vec{h}_b - \vec{h}_a\|}.$$

In some embodiments the MLSE 70 is programmed or otherwise configured to make 1 bit decisions at a time. For example, the MLSE disclosed in U.S. patent application Ser. No. 11/736,515 includes embodiments wherein two bits are decided at a time. Where 1 bit decisions are made at a time, the simulated BER may be calculated according to which of the 1 bit decisions is most likely to result in an error, based on the abovenoted assumption that only one bit error will occur for each decision of the MLSE.

Figure 11:
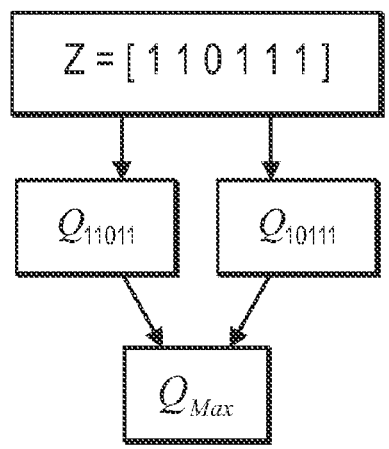
FIG. 11 is a process flow diagram illustrating data structures for use in calculating a maximum simulated BER in accordance with the method of FIG. 9.

Referring to FIG. 11, while still referring to FIG. 9, the method 140 may therefore include identifying a maximum simulated BER for output vectors at step 144 corresponding to the number of bits output for each decision of the MLSE. The output vectors may be of the length 2N+1−2. The output vectors are decomposed into truncated vectors of length 2N−1. For example, the first 2N−1 bits may be a first truncated vector, the 2N−1 bits starting at a second bit position may be a second truncated vector, and so on until the last bit position that is followed by 2N−2 bits of the output vector. The result is 1 truncated vectors. The simulated BER values calculated at step 142 corresponding to each truncated vector of the output vector are then compared to identify the maximum simulated BER for a given output vector.

As shown in FIG. 11, for l=2 a six bit output vector will be used. A vector equal to 110111 will therefore be decomposed into the truncated vectors 11011 and 10111. The corresponding simulated BER values $Q_{11011}$ and $Q_{10111}$ will then be compared to identify a maximum simulated BER $Q_{Max}$.

Referring again to FIG. 9, the maximum simulated BERs for the output vectors are then aggregated at step 146, such as by averaging to generate an aggregate simulated BER. In one embodiment, the maximum simulated BERs for each output vector are summed and divided by $12^{2N+l-2}$. The aggregate simulated BER is then evaluated at step 148 to determine if an end condition has been reached. As in the above described embodiments, the end condition may include an aggregate simulated BER less than or equal to a predetermined threshold. Alternatively, the end condition may be when some or all of the AFE coordinate values are less than a particular value (e.g. 0.1) from the AFE coordinate chosen in the previous iteration of the method 116. In other embodiments, the end condition is when some or all of the AFE coordinate values are within a certain tolerance from each other, e.g. 10 mV.

If the end condition is reached then the process 140 may end. In some embodiments, if the end condition is reached, then steps 128-134 of the method illustrated in FIG. 8 are performed in order to cause the mean of the estimates to satisfy a second end condition.

If the end condition is found not to have been achieved at step 148, then AFE coordinates are selected at step 150 and channel estimates are accumulated at step 152 preparatory to another iteration of the method 140.

The method of FIGS. 9 through 11 provides the advantage of reducing the number of distance computations and noise projections to $2^{(2N-1)}$. Furthermore, the number of elements in the vectors used for the noise projections and distance computations is also reduced to N rather than M−N+1.

Figure 12:
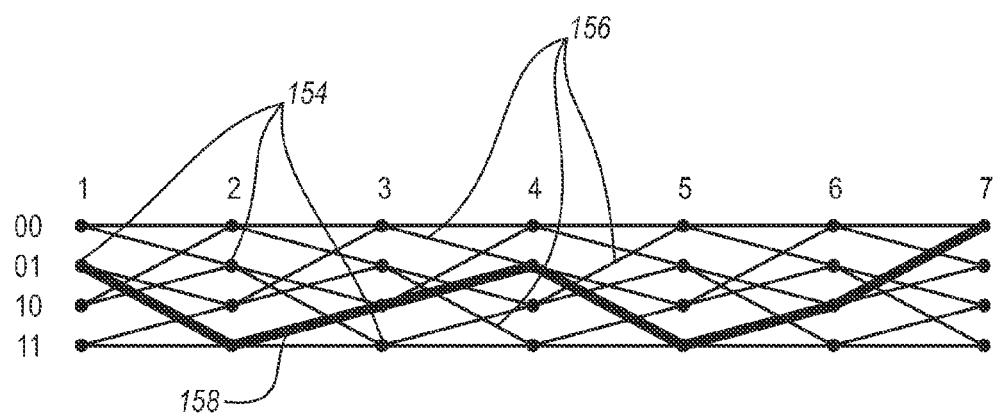
FIG. 12 illustrates a trellis representing a Viterbi algorithm used to identify an adjacent mean vector in Euclidean space.
Figure 13:
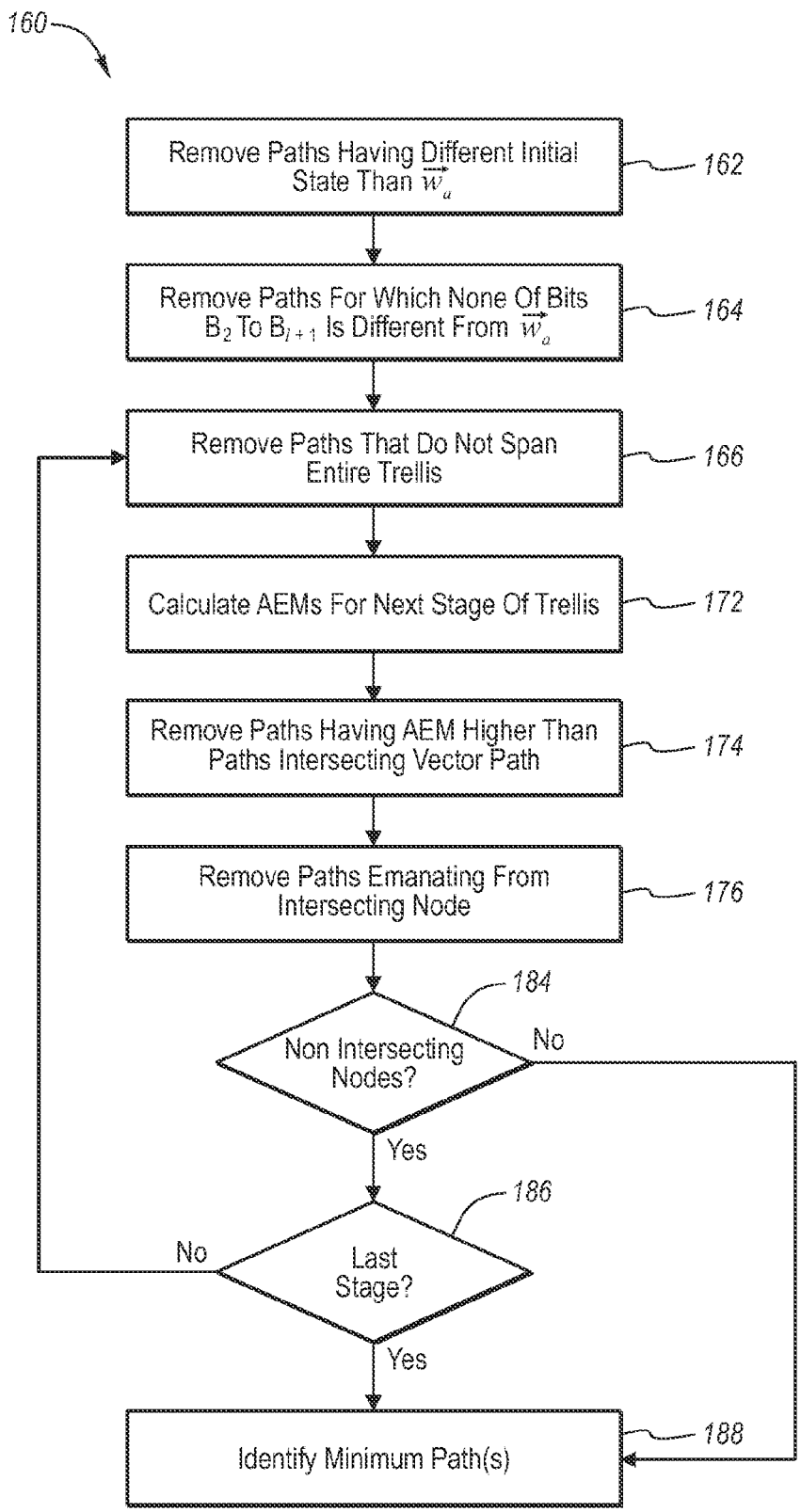
FIG. 13 is a process flow diagram of a method for identifying a closest mean vector in Euclidean space using a modified Viterbi algorithm in accordance with an embodiment of the present invention.

Referring to FIG. 12, as noted above with respect to the methods of FIGS. 6 and 7, a simulated BER may only be calculated for an M-bit vector with respect to adjacent M-bit vectors. In some embodiments a modified Viterbi algorithm is used to identify an M-bit vector $\vec{w}_b$ for a given M-bit vector $\vec{w}_a$ that has the closest mean vector $\vec{h}_b$. In some embodiments, the Viterbi algorithm is used to identify the two closest mean vectors $\vec{w}_b$ and $\vec{w}_c$, where $\vec{w}_b$ has the closest mean vector $\vec{h}_b$ of all M-bit vectors satisfying the relation $w_{a,0} = w_{b,0}$, $w_{a,1} = w_{b,1}$, and $w_{a,2} \neq w_{b,2}$, and where $\vec{w}_c$ has the closest mean vector $\vec{h}_c$ of all M-bit vectors satisfying the relation $w_{a,0} = w_{c,0}$, $w_{a,1} = w_{c,1}$, and $w_{a,3} \neq w_{c,3}$.

The Viterbi algorithm may be visualized using a trellis having nodes 154 representing state transitions and edges 156 extending between nodes of the trellis representing possible sequences of transitions. In the illustrated embodiments, the state transitions include four possible bit transitions 00, 01, 10, and 11. The trellis includes a number of stages with each stage including four nodes representing the four possible bit transitions. Each node of each stage has two edges emanating therefrom to two nodes of a subsequent stage representing the two possible bit transitions that may follow the bit transition of that node. For example, a node 00 is connected to two edges to nodes 00 and 01 of a subsequent stage inasmuch as these are the only possible bit transitions following a 00 bit transition.

In some embodiments, a given vector $\vec{w}_a$ is associated with a path 158 spanning the trellis by mapping the bit transitions of the vector $\vec{w}_a$ to edges of the trellis. In the illustrated example, the vector $\vec{w}_a = 01101100$ is associated with a path intersecting node 01 of the first stage, node 11 of the second stage, node 10 of the third stage, and so on until node 00 of the seventh stage.

Figure 14A:
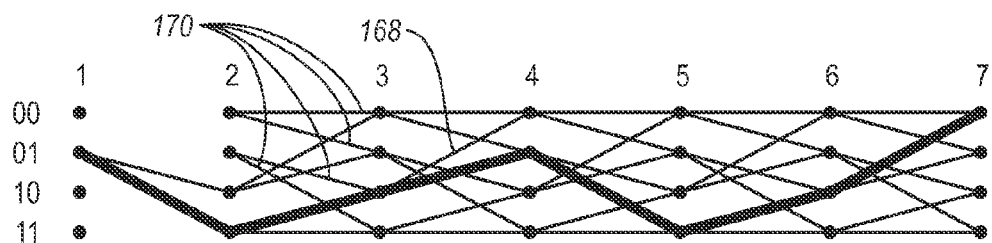
FIGS. 14A through 14E illustrate transformation of a trellis according to the modified Viterbi algorithm of FIG. 13.

Referring to FIG. 13 and FIGS. 14A-14F, a method 160 may be used to identify at least one closest vector $\vec{w}_b$ using the trellis of FIG. 12. At step 162, the method 160 includes removing edges from the trellis according to initial constraints of the decoding algorithm used to decode received samples. In the illustrated embodiment, this includes removing edges that do not satisfy the constraint that the first two N-bit sequences $b_0$ and $b_1$ selected for a series of samples be equal to the N bit sequences $b_{M-2}$ and $b_{M-1}$ selected for a previous iteration of the decoding algorithm. Therefore, only edges of the first stage that have the same bit transition $B_0 \rightarrow B_1$ as the vector $\vec{w}_a$ need to be considered. In some embodiments, the bit transitions of two or more stages are constrained, with all paths not satisfying the constraints being removed at step 162. Referring to FIG. 14A, in the illustrated example edges emanating from nodes 00, 10, and 11 are removed inasmuch as they do not include the same initial bit transition as vector $\vec{w}_a$=01101100.

At step 164, edges extending from the second stage to the third stage are removed that correspond to bit sequences having both third and fourth bits ($B_2$ and $B_3$) that are identical to bits $B_2$ and $B_3$ of the vector $\vec{w}_a$. In some MLSEs, such as may be used in accordance with the invention, only the third and fourth bits represent actual bit decisions that are output and therefore can result in bit errors. The remaining bits of the vector represent the look-ahead of the MLSE, which is to say the additional samples that are used to decode the samples corresponding to the third and fourth bits. Accordingly, in some embodiments, only edges between the first and second stage that correspond to bit sequences for which one or both of the third and fourth bits are different correspond to possible errors. In embodiments where l bit decisions are made at a time, with l being a number that may be other than two, step 164 may include removing edges between the second stage and stage I+1 that do not lie on a path for which at least one of bits $B_2$ through $B_{l+1}$ are different from the corresponding bit of the vector $\vec{w}_a$.

In some embodiments, for l>N−1, the algorithm may be simplified by using a trellis having a first stage with $2^l$ states. In this manner, evaluating which paths satisfy the constraint that one of bits $B_2$ through $B_{l+1}$ be different from $\vec{w}_a$ can be evaluated by examining paths up to the nodes of the third stage. Where a trellis having only $2^{N-1}$ states per stage is used, multiple stages (l) must be examined before some edges may be removed to ensure that only paths not satisfying the constraint are removed. For example for the example vector of 01101100 and l=3, bit sequences that are described by identical paths through the trellis for stages two and three (0110) but are different at stage four (01100) will satisfy the constraint. Therefore, edges that fail to satisfy this constraint may not be removed until stages two through four have been evaluated.

At step 166, edges that lie only on paths that do not span the entire trellis are removed. Inasmuch as some edges are removed at steps 162 and 164, some of the nodes in following stages do not have any edges extending to them from the previous stage. Any paths including these nodes do not satisfy the constraints imposed by the algorithm and therefore any edges emanating from nodes for which all edges from the previous stage connecting to that node have been removed do not span the trellis and are therefore removed at step 166. Step 166 may be repeated for each stage, such as prior to executing step 172.

Referring to FIG. 14A, in the illustrated example, step 164 includes removing edge 168 extending to node 10 of the third stage inasmuch as this path corresponds to bit sequences beginning with 0110, which is identical to the first four bits of the vector $\vec{w}_a$. Step 166 includes removing edges 170 emanating from nodes 00 and 01 of the second stage inasmuch as there are no edges extending from the node 00 of the first stage and therefore no paths including nodes 00 and 01 of the second stage span the entire trellis.

At step 172, an accumulated error metric (AEM) is calculated for all remaining paths up to and including the nodes of the next stage of the trellis. The first time step 172 is executed for a vector $\vec{w}_a$, the next stage is the stage following the initial stage and the l stages that are constrained to include at least one transition that is not identical to the vector path $P_a$ corresponding to the vector $\vec{w}_a$.

Step 172 is executed for each stage of the trellis following the one or more initial stages that are constrained to be the same as the vector $\vec{w}_a$. For each subsequent iteration of the step 172 during processing of the same vector $\vec{w}_a$, the next stage is the stage following the stage used in the previous iteration of the step 172.

For a given stage F, the AEM is equal to the Euclidean distance between a mean vector corresponding to a bit vector $\vec{C}_a$ equal to bits 0 through F of $\vec{w}_a$ and mean vectors corresponding to bit vectors $\vec{C}_b$ of length F+1 corresponding to the bit transitions of remaining paths up to and including the nodes of stage F. Remaining paths are those the edges of which are not removed during execution of the method 160.

As in other methods described hereinabove, the mean vectors are calculated by first decomposing the vector $\vec{C}_a$ and one of the vectors $\vec{C}_b$ into estimate index vectors $\vec{y}_a$ and $\vec{y}_b$, respectively, wherein each element $y_i$ of each index vector is equal $C_i \ldots C_{i+N-1}$ of its corresponding vector $\vec{C}_a$, $\vec{C}_b$. For the estimate index vectors $\vec{y}_a$ and $\vec{y}_b$ estimate mean vectors $\vec{h}_a$ and $\vec{h}_b$ are calculated where $\vec{h} = \bar{x}_0 \ldots \bar{x}_s \ldots \bar{x}_{N-1}$ and $\bar{x}_s$ is equal to a mean of a number of estimates $\hat{r}_k$ over time having the same index k=$y_s$. The estimates $\hat{r}_0 \ldots \hat{r}_k \ldots \hat{r}_{2^N-1}$ may be normalized before calculation of the mean vectors $\vec{h}_a$ and $\vec{h}_b$.

The AEM of a remaining path may be calculated according to the equation $$AEM = \sqrt{\sum_{i=0}^{N-1}(h_{b,i} - h_{a,i})^2}.$$

In other embodiments, the AEM is calculated according to the equation $$AEM = \sum_{i=0}^{N-1}(h_{b,i} - h_{a,i})^2.$$

In this manner the AEM at each stage is equal to the AEM of paths up to the previous stage plus a single additional term equal to $(h_{b,F} - h_{a,F})^2$.

At step 174, the AEMs calculated at step 172 for stage F are compared to the AEM for the remaining path $P_F$ that intersects the same node of stage F that intersects the path $P_a$ corresponding to the vector $\vec{w}_a$. Any edges lying only on paths having an AEM higher than the path $P_F$ are removed. At step 176, edges emanating from the node of stage F that intersects the path $P_a$ are removed. Step 176 includes removing edges that extend from the nodes of the stage F to the stage F+1. Preceding portions of remaining paths path (i.e. stages 1 through F−1) are not removed at step 176 inasmuch as they are still possible minimum paths.

Steps 174 and 176 rely on the observation that for a path $P_a$ corresponding to vector $\vec{w}_a$ and a path $P_k$ that intersects $P_a$ at the kth stage, the minimal extension of the path $P_k$ and the corresponding distance is known: it is the path that coincides with $P_a$ for the remainder of the trellis. Hence, it is not necessary to extend this path in subsequent iterations of the Viterbi algorithm. Furthermore, any path whose accumulated distance metric at an intermediate stage of the trellis is larger than that of a path that intersects $P_a$ can be disregarded, i.e., no longer extended, since such a path clearly cannot be of minimum distance.

Figure 14B:
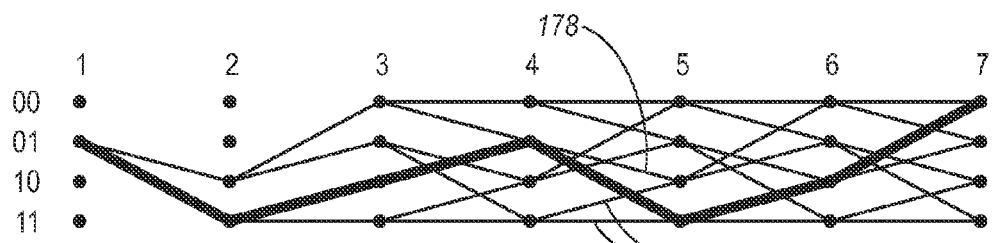
Figure 14C:
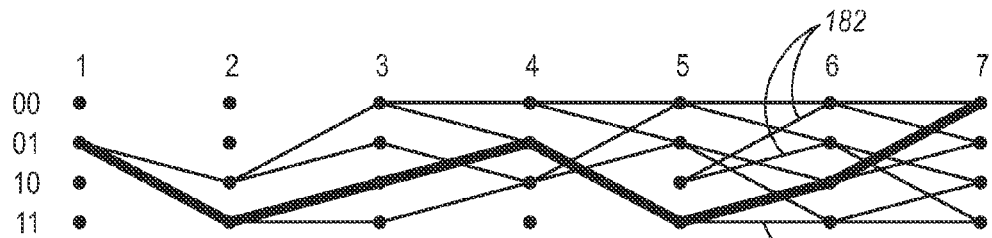

Referring to FIGS. 14B and 14C, in the illustrated example, edges 178 emanating from node 01 of stage four and node 11 of stage five are removed inasmuch as they emanate from an intersecting node. Edges 180 are removed because they have an AEM exceeding the intersecting paths at stages four and five. Edges 182 are removed during step 166 for stage five because they do not span the entire trellis.

At step 184, the method 160 includes evaluating whether any non-intersecting paths remain. If so, then the method 160 includes evaluating whether the stage F is the last stage of the trellis at step 186. If the last stage has not been reached and non-intersecting paths remain, then any edges that lie on paths that do not span the entire trellis are removed according to step 166 for stage F and step 172 is then repeated for the next stage of the trellis, i.e. F=F+1.

If no non intersecting paths remain or the current stage is the last stage in the trellis, then the method 160 includes evaluating which of the remaining paths has a minimum AEM at step 188. Step 188 may include identifying two of the remaining paths one of which has a minimum AEM of paths corresponding a vector $\vec{w}_b$ that satisfies the relation $w_{a,0}=w_{b,0}$, $w_{a,1}=w_{b,1}$, and $w_{a,2}\neq w_{b,2}$ and of all remaining paths satisfying this relation. The other identified path may have a minimum AEM of all remaining paths that correspond to the vector $\vec{w}_c$ that satisfies the relation $w_{a,0}=w_{c,0}$, $w_{a,1}=w_{c,1}$, and $w_{a,3}\neq w_{c,3}$.

Figure 14D:
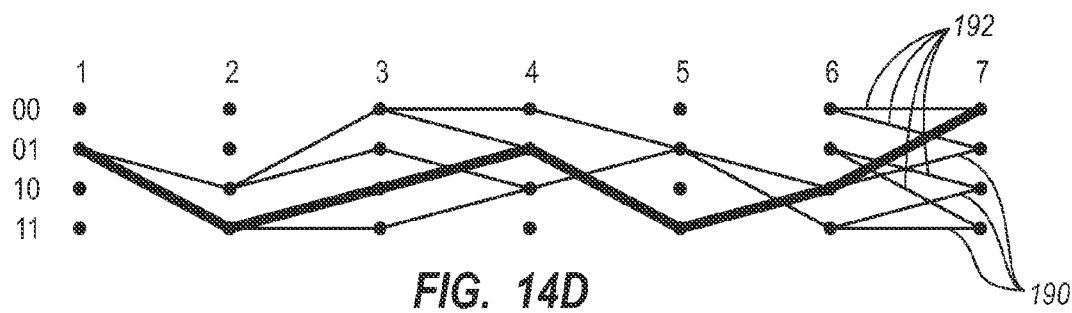

Referring to FIG. 14D, in the illustrated example, edge 190 emanating from stage six is removed inasmuch as it lies on a path that has an AEM that exceeds the intersecting path. Edges 192 are removed during execution of step 166 with respect to stage six inasmuch as they are not part of a path spanning the entire trellis.

Figure 14E:
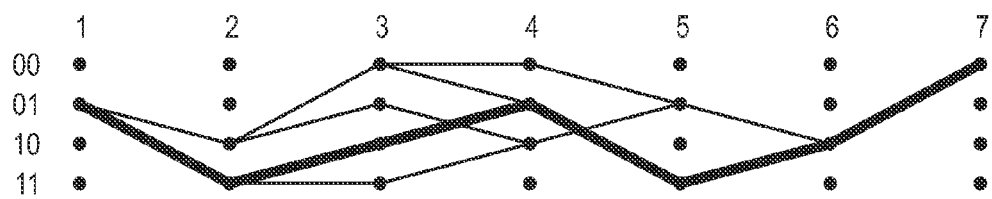

The final remaining paths are as shown in FIG. 14E. In the illustrated example, the bit vectors corresponding to the final remaining paths in the illustrated example are 01000100, 01001100, 01010100, and 01110100. Each of these will be evaluated to determine which has the smallest AEM and therefore has a mean vector closest to that of the bit vector 01101100 in Euclidean space.

The one or more closest vectors identified for each vector $\vec{w}_a$ using the method 160 are then used to calculate simulated BERs in accordance with the methods of FIGS. 6 and 8 in order to, for example, determine a likelihood of confusion between a vector $\vec{w}_a$ and a closest vector $\vec{w}_b$.

Figure 15:
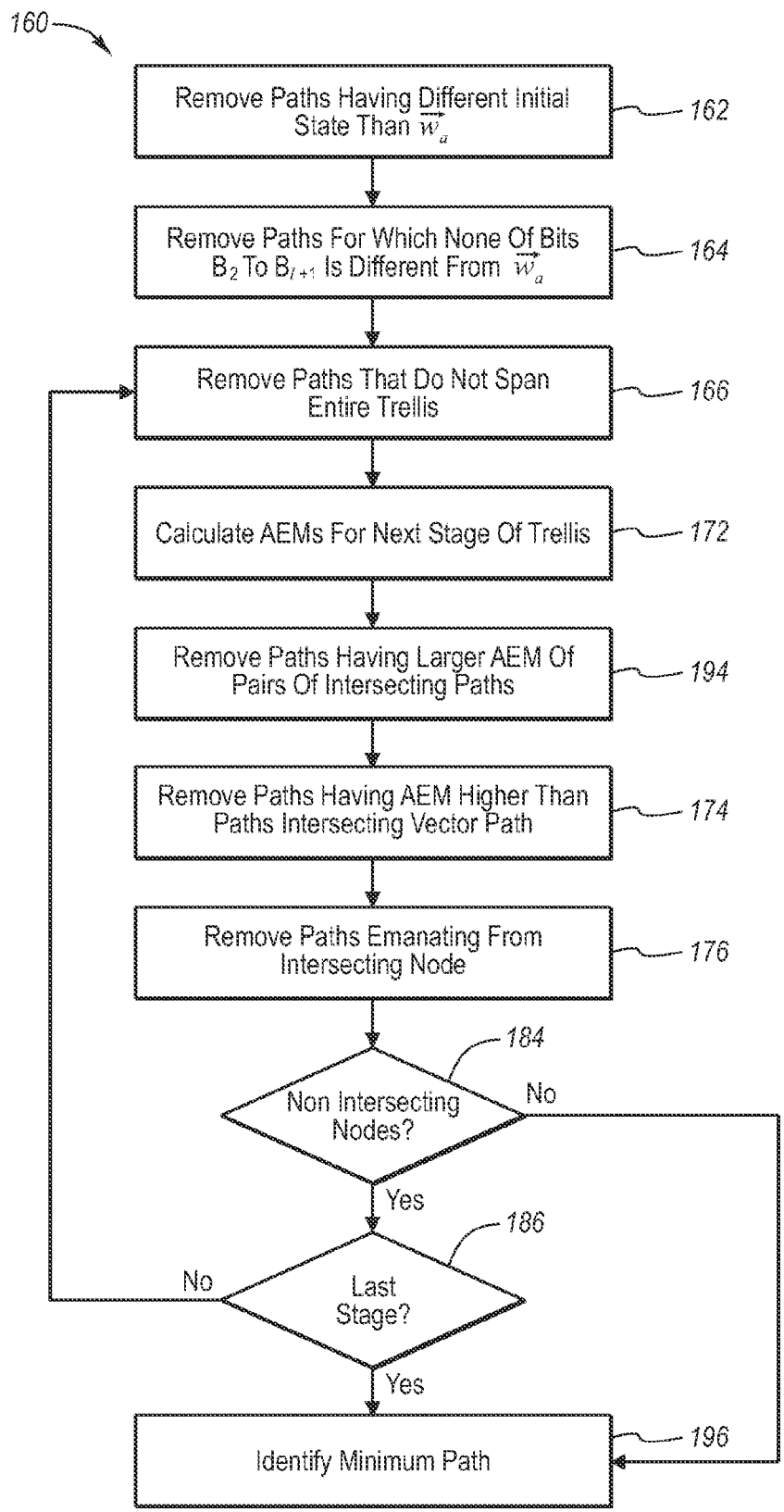
FIG. 15 is a process flow diagram of a method for identifying a closest mean vector in Euclidean space using a modified Viterbi algorithm in accordance with yet another embodiment.

Referring to FIG. 15, in an alternative embodiment, the method 160 is modified to identify only the single closest path. Accordingly, following performing steps 162 and 164 to modify the initial stages of the trellis according to constraints described with respect to FIG. 13, processing of subsequent stages may include the additional step 194 of removing the path having a larger AEM of pairs of intersecting paths 194. In this manner paths that cannot possibly be the single minimum path are eliminated as the method progresses through the trellis, further reducing the number of paths that need to be evaluated in subsequent stages. Step 194 may also include comparing paths that intersect the vector path corresponding to the vector $\vec{w}_a$ being evaluated in a stage prior to or including the stage F being evaluated in a given iteration of step 194. Accordingly, after each step 194 only one path will intersect the vector path in a stage up to and including the stage F being evaluated. Added step 194 provides the benefit of reducing the number of possible paths by at least one half at each stage of the trellis which reduces the amount of memory and computational power required to execute the algorithm.

In the event that multiple paths remain upon reaching the final stage of the trellis, any remaining paths may be compared at step 196 to identify the minimum path as constrained by the initial constraints of steps 162 and 164.

Figure 16A:
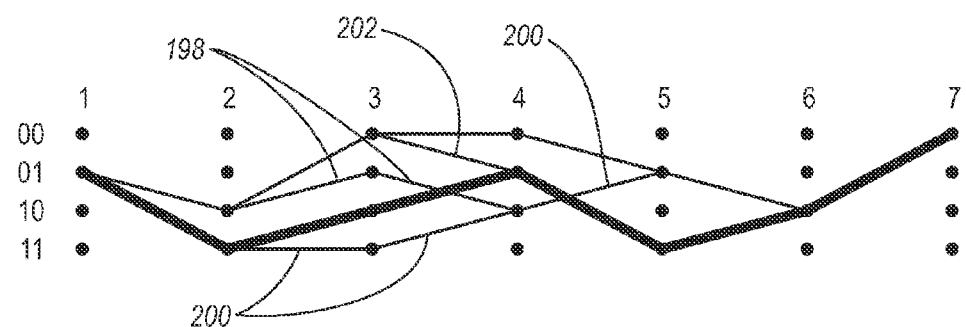
FIGS. 16A through 16B illustrate transformation of a trellis according to the modified Viterbi algorithm of FIG. 15.
Figure 16B:
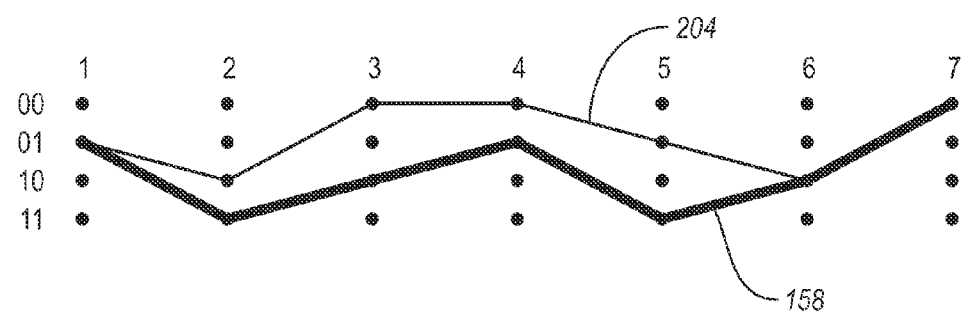

Referring to FIG. 16A, in the illustrated example, edges 198 may be removed during execution of step 194 with respect to stage four as lying on a path having an AEM larger than the other path intersecting node 10 of stage four. Step 194 is executed for the first time with respect to stage four inasmuch as stages one through three are subject to the initial constraints of steps 162 and 164. Edges 200 may be removed during execution of step 194 with respect to stage five as lying on a path having an AEM larger than the other path intersecting node 01 of stage five. Edge 202 may be removed during execution of step 194 with respect to stage six as belonging to a path intersecting the vector path that has an AEM larger than the path intersecting the vector path at stage six. Referring to FIG. 16B, the final trellis in the illustrated example will therefore appear as shown with a single minimum path 204 that intersects the vector path 158 at stage six.

In an alternative embodiment, the method of FIG. 15 may be used to identify the two closest minimum paths each of which corresponds to the closest vector having one bit error. The method of FIG. 15 may be executed a first time with the step 162 including removing all paths that do not satisfy the requirement that only the third bit ($B_2$) be different from the vector $\vec{w}_a$ being evaluated. The method of FIG. 15 may then be executed a second time with step 162 including removing all paths that do not satisfy the requirement that only the fourth bit ($B_3$) be different from the vector $\vec{w}_a$ being evaluated. In the more general case where l bits are decided, the method of FIG. 15 may be executed l times for each vector $\vec{w}_a$ where for each iteration a different bit position from $B_3$ to $B_{l+2}$ being constrained to be different from the vector path corresponding to the vector $\vec{w}_a$ in order to identify l vectors corresponding to the l different vectors having a single bit error. A simulated BER for each of the l vectors may then be calculated according to the methods described above. The maximum simulated BER of the l vectors for each vector $\vec{w}_a$ may then be aggregated for all vectors $\vec{w}_a$ and used as the aggregate simulated BER to tune the AFE 20 according to the above described methods.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for communicating data comprising:
transmitting an original signal over a channel to generate a distorted signal;
conditioning the distorted signal according to signal conditioning parameters; sampling the conditioned signal to generate sampled values; decoding the sampled values according to a comparison of the sampled signal to expected values, each expected value corresponding to a bit sequence distorted according to a model of the channel;
updating the model according to a comparison of the expected values and the sampled values;
calculating a variation among the expected values over time; and
adjusting the signal conditioning parameters such that the variation is reduced.

2. The method of claim 1, wherein the decoding the sampled values according to a comparison of the sampled values to expected values comprises comparing a sequence of sampled values to all possible expected values and selecting a series of bit sequences such that a combined error metric of the sequence of sampled values relative to a series of expected values corresponding to the series of bit sequences is at a minimum relative to other possible series of bit sequences.

3. The method of claim 1, wherein the decoding the sampled values according to a comparison of the sampled values to the expected values comprises decoding the sampled values according to a Viterbi algorithm.

4. The method of claim 1, wherein the decoding the sampled values according to a comparison of the sampled values to the expected values comprises decoding the sampled values according to a time reversed Viterbi algorithm.

5. The method of claim 1, wherein the adjusting the signal conditioning parameters includes adjusting a gain applied to the distorted signal.

6. The method of claim 1, further comprising adjusting a gain until an end condition for variation is achieved followed by adjusting the gain such that a mean of the expected values is equal to a target value.

7. The method of claim 1, wherein the signal conditioning parameters include a bias applied to the distorted signal.

8. The method of claim 1, further comprising detecting bit transitions in the conditioned signals and wherein sampling the conditioned signal comprises sampling the conditioned signal at an offset time from the bit transitions, the method further comprising adjusting the offset time such that the variation is reduced.

9. The method of claim 1, wherein the adjusting the signal conditioning parameters such that the variation is reduced comprises selecting values for the signal conditioning parameters according to a numerical minimization method.

10. The method of claim 9, wherein the numerical minimization method is the Nelder-Mead algorithm.

11. An apparatus for receiving signals comprising:
a signal conditioner configured to condition a received signal according to signal conditioning parameters and to output a conditioned signal;
an analog to digital converter (ADC) configured to receive the conditioned signal and to produce digital samples corresponding to the conditioned signal;
a decoder configured to receive the digital samples and to output decoded data according to a comparison of the digital samples to modeled values generated according to a channel model;
a channel module configured to update the channel model according to a comparison of the modeled values and the digital samples; and a quality of Transmission (QoT) module configured to measure a variation in the modeled values over time and to adjust the signal conditioning parameters such that the variation is reduced.

12. The apparatus of claim 11, wherein the decoder is a time-reversed Viterbi decoder.

13. The apparatus of claim 12, wherein the decoder is a parallel, time-reversed, sliding window Viterbi decoder.

14. The apparatus of claim 11, wherein the QoT module is configured to adjust a gain applied to the received signal.

15. The apparatus of claim 14, wherein the QoT module is configured to adjust a bias applied to the received signal.

16. The apparatus of claim 15, wherein the QoT module is configured to adjust the bias and the gain until a first end condition for variation is achieved and to thereafter adjust the gain such that a mean of the modeled values is equal to a second end condition.

17. The apparatus of claim 11, wherein the ADC is configured to detect bit transitions in the conditioned signals and to sample the conditioned signal an at an offset time from the bit transitions; and wherein the QoT module is further configured to adjust the offset time such that the variation is reduced.

18. A method for communicating data comprising:
transmitting an original signal over a channel to generate a distorted signal;
conditioning the distorted signal according to signal conditioning parameters
sampling the conditioned signal to generate sampled values;
for a plurality of sequences of a M number of consecutive sampled values
generating channel estimates according to a model of the channel, each channel estimate corresponding to the i-th bit of one of $2^N$ N-bit sequences, where N is the number of bits in one of the $2^N$ N-bit sequences;
comparing the sequence of M consecutive sampled values to the channel estimates;
selecting M N-bit sequences such that an aggregate error of the M consecutive sampled values relative to channel estimates corresponding to the M N-bit sequences satisfies an error threshold;
outputting one or more data symbols corresponding to the selected M N-bit sequences; and
comparing at least a portion of the estimates corresponding to the M selected N-bit sequences to the M consecutive sampled values and updating the
model of the channel according to the comparison;
calculating a variation among the channel estimates over time; and
adjusting the signal conditioning parameters such that the variation is reduced.

19. The method of claim 18, wherein the calculating the variation among the channel estimates over time comprises calculating a plurality of variances, each variance corresponding to variation among estimates corresponding to the same N-bit sequence.

20. The method of claim 18, further comprising calculating a simulated bit error rate (BER) for a plurality of states of an M-bit sequence, wherein M is greater than N.

21. The method of claim 20, wherein the calculating the simulated BER comprises:
for a plurality of M-bit sequences $\vec{w}_a$
decomposing the M-bit sequence $\vec{w}_a$ into M−N+1 N-bit sequences;
calculating a noise vector $\vec{\lambda}_a$ including a plurality of variances, each variance corresponding to the variation of channel estimates corresponding to one of the M−N+1 N-bit sequences;
calculating a mean vector $\vec{h}_a$ including a plurality of means, each mean corresponding to the mean of channel estimates corresponding to one of the N-bit sequences of the M−N+1 N-bit sequences;
identifying at least one other M-bit sequence $\vec{w}_b$ having an adjacent mean vector $\vec{h}_n$ Euclidean space; and
calculating a parameter corresponding to a projection of the noise vector $\vec{\lambda}_a$ along a unit vector between $\vec{h}_a$ and $\vec{h}_b$; and
setting the simulated BER equal to an aggregation of the parameters.

22. The method of claim 21, wherein the calculating the parameter corresponding to the projection of the noise vector $\vec{\lambda}_a$, along the unit vector between $\vec{w}_a$ and $\vec{w}_b$ comprises setting the parameter equal to $Q\left(\dfrac{d_{a\to b}}{2\sigma_{a\to b}}\right)$, where $\sigma_{a\to b} = \sqrt{\vec{u}_{a\to b}^T \lambda_a \vec{u}_{a\to b}}$, $\vec{u}_{a\to b} = \dfrac{\vec{h}_b - \vec{h}_a}{\|\vec{h}_b - \vec{h}_a\|}$, $d_{a\to b} = \sqrt{\sum_{i=0}^{M-N}(h_{b,i} - h_{a,i})^2}$, and $Q(x) = 0.5\,\mathrm{erfc}\left(\dfrac{x}{\sqrt{2}}\right)$, where $\sigma_{a\to b}$ is a noise standard deviation from $\vec{w}_a$ and $\vec{w}_b$, $\vec{u}_{a\to b}$ is a unit vector, $\vec{u}_{a\to b}^T$ is a transpose of the unit vector, $d_{a\to b}$ is a Euclidean distance between the mean vectors $\vec{h}_a$ and $\vec{h}_b$, and x is a point of intersection.

23. The method of claim 21, wherein the calculating the parameter corresponding to the projection of the noise vector $\vec{\lambda}_a$ along the unit vector between $\vec{w}_a$ and $\vec{w}_b$ comprises setting the parameter equal to $Q\left(\dfrac{x}{\sigma_{a\to b}}\right)$, where $\sigma_{a\to b} = \sqrt{\vec{u}_{a\to b}^T \lambda_a \vec{u}_{a\to b}}$, $\vec{u}_{a\to b} = \dfrac{\vec{h}_b - \vec{h}_a}{\|\vec{h}_b - \vec{h}_a\|}$, $x = \dfrac{\sigma_{a\to b} \pm \sqrt{\sigma_{a\to b}^2 \sigma_{b\to a}^2 d_{a\to b}^2 + 4\sigma_{a\to b}^2 \sigma_{b\to a}^4 \ln\left(\dfrac{\sigma_{b\to a}}{\sigma_{a\to b}}\right) - 4\sigma_{b\to a}^2 \sigma_{a\to b}^4 \ln\left(\dfrac{\sigma_{b\to a}}{\sigma_{a\to b}}\right)}}{(\sigma_{a\to b}^2 - \sigma_{b\to a}^2)^2}$, and $Q(x) = 0.5\,\mathrm{erfc}\left(\dfrac{x}{\sqrt{2}}\right)$, where $\sigma_{a\to b}$ is a noise standard deviation from $\vec{w}_a$ and $\vec{w}_b$, $\sigma_{b\to a}$ is a noise standard deviation from $\vec{w}_b$ and $\vec{w}_a$, $\vec{u}_{a\to b}$ is a unit vector, $\vec{u}_{a\to b}^T$ is a transpose of the unit vector, and x is a point of intersection.

24. The method of claim 21, wherein the identifying at least one other M-bit sequence $\vec{w}_b$ having an adjacent mean vector $\vec{h}_b$ in Euclidean space further comprises:

identifying at least two other M-bit sequences $\vec{w}_b$, and $\vec{w}_c$, wherein $\vec{w}_b$ has the closest mean vector $\vec{h}_b$ of all M-bit sequences satisfying the relation $w_{a,0}=w_{b,0}$, $w_{a,1}=w_{b,1}$, $w_{a,2}\neq w_{b,2}$ and wherein $\vec{w}_c$ has the closest mean vector $\vec{h}_b$ of all M-bit sequences satisfying the relation $w_{a,0}=w_{c,0}$, $w_{a,1}=w_{c,1}$ and $w_{a,3}\neq w_{c,3}$.

25. The method of claim 24, wherein the calculating the parameter corresponding to the projection of the noise vector $\vec{\lambda}_a$ along the unit vector between $\vec{w}_a$ and $\vec{w}_b$ comprises setting the parameter equal to $Q\left(\dfrac{d_{a\to b}}{2\sigma_{a\to b}}\right) + Q\left(\dfrac{d_{a\to c}}{2\sigma_{a\to c}}\right)$, where $\sigma_{a\to b} = \sqrt{\vec{u}_{a\to b}^T \lambda_a \vec{u}_{a\to b}}$, $\vec{u}_{a\to b} = \dfrac{\vec{h}_b - \vec{h}_a}{\|\vec{h}_b - \vec{h}_a\|}$, $d_{a\to b} = \sqrt{\sum_{i=0}^{M-N}(h_{b,i} - h_{a,i})^2}$, $\sqrt{\vec{u}_{a\to c}^T \lambda_a \vec{u}_{a\to c}}$, $\vec{u}_{a\to c} = \dfrac{\vec{h}_c - \vec{h}_a}{\|\vec{h}_c - \vec{h}_a\|}$, $d_{a\to c} = \sqrt{\sum_{i=0}^{M-N}(h_{c,i} - h_{a,i})^2}$, and $Q(x) = 0.5\,\mathrm{erfc}\left(\dfrac{x}{\sqrt{2}}\right)$, where $\sigma_{a\to b}$ is a noise standard deviation from $\vec{w}_a$ and $\vec{w}_b$, where $\sigma_{a\to c}$ is a noise standard deviation from $\vec{w}_a$ and $\vec{w}_c$, $\vec{u}_{a\to b}$ is a unit vector, $\vec{u}_{a\to b}^T$ is a transpose of the unit vector $\vec{u}_{a\to b}$, $d_{a\to b}$ is a Euclidean distance between the mean vectors $\vec{h}_a$ and $\vec{h}_b$, $d_{a\to c}$ is a Euclidean distance between the mean vectors $\vec{h}_a$ and $\vec{h}_c$, $\vec{u}_{a\to c}$ is a unit vector, $\vec{u}_{a\to c}^T$ is a transpose of the unit vector $\vec{u}_{a\to b}$ and x is a point of intersection.

26. The method of claim 21, wherein the identifying at least one other M-bit sequence $\vec{w}_b$ having an adjacent mean vector $\vec{h}_b$ in Euclidean space comprises using a Viterbi algorithm.

27. The method of claim 18, wherein generating channel estimates according to the model of the channel, comprises generating channel estimates $\hat{r}_0 \ldots \hat{r}_k \ldots \hat{r}_{2^N-1}$ wherein each estimate $\hat{r}_k$ is equal to an expected sampled value for the i-th bit of one of the N-bit sequences having a value equal to the estimate index k according to the model of the transmission channel.

28. The method of claim 27, wherein the calculating the variation among the channel estimates over time comprises calculating a histogram divergence D(P,Q) between a histogram P and a histogram Q according to the equation $$D(P, Q) = \sum_{k=o}^{2^N-1} \sum_{i=0}^{B} P_k(x) \log\left(\dfrac{P_k(x)}{Q_k(x)}\right),$$

wherein B is the number of channel estimates for each estimate index k in the histograms P and Q, histogram P includes a histogram of channel estimates $\hat{r}_0 \ldots \hat{r}_k \ldots \hat{r}_{2^N-1}$ from a time $t_0$ to time $t_1$ and histogram Q includes a histogram of channel estimates $\hat{r}_0 \ldots \hat{r}_k \ldots \hat{r}_{2^N-1}$ from time $t_2$ to time $t_3$, wherein $t_3$ is not equal to $t_1$, and $P_k(x)$ and $Q_k(x)$ represent the frequency of an analog to digital converter value x in a histogram of estimates $\hat{r}_k$ for index k.

* * * * *